United States Patent
Zhao et al.

(10) Patent No.: US 10,354,354 B2
(45) Date of Patent: Jul. 16, 2019

(54) CONTENT SYNCHRONIZATION USING WATERMARK TIMECODES

(71) Applicant: Verance Corporation, San Diego, CA (US)

(72) Inventors: Jian Zhao, San Diego, CA (US); Joseph M. Winograd, San Diego, CA (US); Rade Petrovic, San Diego, CA (US)

(73) Assignee: Verance Corporation, San Diego, CA (US)

(*) Notice: Subject to any disclaimer, the term of this patent is extended or adjusted under 35 U.S.C. 154(b) by 0 days.

(21) Appl. No.: 14/831,752

(22) Filed: Aug. 20, 2015

(65) Prior Publication Data
US 2016/0057317 A1 Feb. 25, 2016

Related U.S. Application Data

(60) Provisional application No. 62/039,547, filed on Aug. 20, 2014.

(51) Int. Cl.
H04N 7/16 (2011.01)
G06T 1/00 (2006.01)
(Continued)

(52) U.S. Cl.
CPC ............ *G06T 1/0028* (2013.01); *G06F 21/16* (2013.01); *G06K 9/00744* (2013.01);
(Continued)

(58) Field of Classification Search
CPC ............ H04N 5/4401; H04N 7/17318; H04N 21/4622; H04N 21/435; H04N 21/84;
(Continued)

(56) References Cited

U.S. PATENT DOCUMENTS 5,995,153 A * 11/1999 Moeller ............... G11B 27/034 348/E7.003
6,122,610 A 9/2000 Isabelle
(Continued)

FOREIGN PATENT DOCUMENTS

CN 102474658 5/2012
CN 103299648 9/2013
(Continued)

OTHER PUBLICATIONS

"ATSC-3.0 Automatic Content Recognition Watermarking Solutions," ATSC Technology Group, Advanced Television Systems Committee, Inc., Jan. 2014 (6 pages).
(Continued)

*Primary Examiner* — Annan Q Shang
(74) *Attorney, Agent, or Firm* — Perkins Coie LLP; Donald L. Wenskay

(57) ABSTRACT

Methods, devices and computer program products allow improved synchronization among multiple contents. One disclosed method includes receiving a first and a second content and performing watermark extraction to recover a first timecode as part of a watermark embedded into a segment of that content. The first timecode conforms to a first type of timing system. Next, a timing system associated with the second content is determined, and a mapping is obtained that allows timecode conversion between the first and the second timing systems. Using the mapping to synchronize the presentation of the second content with that of the first content. Thus synchronization of multiple contents is properly maintained even when processing operations such as format conversion and transcoding cause metadata streams that carry timing information to be removed.

28 Claims, 9 Drawing Sheets

(51) Int. Cl.
  *H04N 19/467* (2014.01)
  *G06K 9/00* (2006.01)
  *H04N 5/08* (2006.01)
  *G06F 21/16* (2013.01)
  *H04N 21/00* (2011.01)
  *H04N 21/4627* (2011.01)
  *H04N 21/8358* (2011.01)
  *H04N 21/43* (2011.01)

(52) U.S. Cl.
  CPC ............ *G06T 1/005* (2013.01); *G06T 1/0085* (2013.01); *H04N 5/08* (2013.01); *H04N 19/467* (2014.11); *H04N 21/00* (2013.01); *H04N 21/4307* (2013.01); *H04N 21/4627* (2013.01); *H04N 21/8358* (2013.01); *G06T 2201/005* (2013.01); *G06T 2201/0065* (2013.01)

(58) Field of Classification Search
  CPC ............. H04N 21/235; H04N 21/4147; H04N 21/4334; H04N 21/4345; H04N 21/43615; H04N 21/47214; H04N 21/4126; H04N 21/47202; H04N 21/6143; H04N 21/6547; H04N 21/42204; H04N 7/106; H04N 7/173; H04N 7/17309
  USPC .................................. 725/139, 68, 131, 151
  See application file for complete search history.

(56) References Cited

U.S. PATENT DOCUMENTS

| | | | |
|---|---|---|---|
| 6,145,081 A | 11/2000 | Winograd et al. | |
| 6,175,627 B1 | 1/2001 | Petrovic et al. | |
| 6,314,192 B1 | 11/2001 | Chen et al. | |
| 6,411,725 B1 | 6/2002 | Rhoads et al. | |
| 6,427,012 B1 | 7/2002 | Petrovic | |
| 6,430,301 B1 | 8/2002 | Petrovic | |
| 6,490,579 B1 | 12/2002 | Gao et al. | |
| 6,556,688 B1 | 4/2003 | Ratnakar | |
| 6,577,747 B1 | 6/2003 | Kalker et al. | |
| 6,683,958 B2 | 1/2004 | Petrovic | |
| 6,721,439 B1 | 4/2004 | Levy et al. | |
| 6,757,405 B1 | 6/2004 | Muratani et al. | |
| 6,792,542 B1 | 9/2004 | Lee et al. | |
| 6,839,673 B1 | 1/2005 | Choi et al. | |
| 6,888,943 B1 | 5/2005 | Lam et al. | |
| 6,895,430 B1 | 5/2005 | Schneider | |
| 6,931,536 B2 | 8/2005 | Hollar | |
| 7,024,018 B2 | 4/2006 | Petrovic | |
| 7,092,774 B1 * | 8/2006 | Gifford .................. G10L 21/04 700/94 |
| 7,140,043 B2 | 11/2006 | Choi et al. | |
| 7,159,118 B2 | 1/2007 | Petrovic | |
| 7,224,819 B2 | 5/2007 | Levy et al. | |
| 7,343,397 B2 | 3/2008 | Kochanski | |
| 7,460,667 B2 | 12/2008 | Lee et al. | |
| 7,533,266 B2 | 5/2009 | Bruekers et al. | |
| 7,548,565 B2 * | 6/2009 | Sull .................. G06F 17/30796 370/503 |
| 7,689,532 B1 | 3/2010 | Levy | |
| 7,707,422 B2 | 4/2010 | Shin et al. | |
| 7,774,834 B1 | 8/2010 | Chauhan et al. | |
| 7,779,271 B2 | 8/2010 | Langelaar | |
| 7,983,922 B2 | 7/2011 | Neusinger et al. | |
| 7,986,806 B2 | 7/2011 | Rhoads | |
| 7,991,995 B2 | 8/2011 | Rabin et al. | |
| 8,005,258 B2 | 8/2011 | Petrovic et al. | |
| 8,015,410 B2 | 9/2011 | Pelly et al. | |
| 8,055,013 B2 | 11/2011 | Levy et al. | |
| 8,059,815 B2 | 11/2011 | Lofgren et al. | |
| 8,059,858 B2 | 11/2011 | Brundage et al. | |
| 8,081,757 B2 | 12/2011 | Voessing et al. | |
| 8,085,935 B2 | 12/2011 | Petrovic | |
| 8,103,049 B2 | 1/2012 | Petrovic et al. | |
| 8,138,930 B1 | 3/2012 | Heath | |
| 8,151,113 B2 | 4/2012 | Rhoads | |
| 8,181,262 B2 | 5/2012 | Cooper et al. | |
| 8,189,861 B1 | 5/2012 | Rucklidge | |
| 8,194,803 B2 | 6/2012 | Baum et al. | |
| 8,249,992 B2 | 8/2012 | Harkness et al. | |
| 8,259,873 B2 | 9/2012 | Baum et al. | |
| 8,280,103 B2 | 10/2012 | Petrovic et al. | |
| 8,301,893 B2 | 10/2012 | Brundage | |
| 8,315,835 B2 | 11/2012 | Tian et al. | |
| 8,321,679 B2 | 11/2012 | Petrovic et al. | |
| 8,340,348 B2 | 12/2012 | Petrovic et al. | |
| 8,346,532 B2 | 1/2013 | Chakra et al. | |
| 8,346,567 B2 | 1/2013 | Petrovic et al. | |
| 8,434,123 B2 | 4/2013 | Liwerant et al. | |
| 8,467,717 B2 | 6/2013 | Croy et al. | |
| 8,479,225 B2 | 7/2013 | Covell et al. | |
| 8,483,136 B2 | 7/2013 | Yuk et al. | |
| 8,533,481 B2 | 9/2013 | Petrovic et al. | |
| 8,538,066 B2 | 9/2013 | Petrovic et al. | |
| 8,560,604 B2 | 10/2013 | Shribman et al. | |
| 8,588,459 B2 | 11/2013 | Bloom et al. | |
| 8,589,969 B2 | 11/2013 | Falcon | |
| 8,601,504 B2 | 12/2013 | Stone et al. | |
| 8,615,104 B2 | 12/2013 | Petrovic et al. | |
| 8,666,528 B2 | 3/2014 | Harkness et al. | |
| 8,682,026 B2 | 3/2014 | Petrovic et al. | |
| 8,713,618 B1 | 4/2014 | Kuznetsov | |
| 8,726,304 B2 | 5/2014 | Petrovic et al. | |
| 8,745,403 B2 | 6/2014 | Petrovic | |
| 8,768,714 B1 | 7/2014 | Blesser | |
| 8,781,967 B2 | 7/2014 | Tehranchi et al. | |
| 8,791,789 B2 | 7/2014 | Petrovic et al. | |
| 8,806,517 B2 | 8/2014 | Petrovic et al. | |
| 8,811,655 B2 | 8/2014 | Petrovic et al. | |
| 8,825,518 B2 | 9/2014 | Levy | |
| 8,838,977 B2 | 9/2014 | Winograd et al. | |
| 8,838,978 B2 | 9/2014 | Winograd et al. | |
| 8,869,222 B2 | 10/2014 | Winograd et al. | |
| 8,898,720 B2 | 11/2014 | Eyer | |
| 8,923,548 B2 | 12/2014 | Petrovic et al. | |
| 8,959,202 B2 | 2/2015 | Haitsma et al. | |
| 8,990,663 B2 | 3/2015 | Liu et al. | |
| 9,009,482 B2 | 4/2015 | Winograd | |
| 9,042,598 B2 | 5/2015 | Ramaswamy et al. | |
| 9,055,239 B2 | 6/2015 | Tehranchi et al. | |
| 9,106,964 B2 | 8/2015 | Zhao | |
| 9,117,270 B2 | 8/2015 | Wong et al. | |
| 9,147,402 B2 | 9/2015 | Chen et al. | |
| 9,277,183 B2 | 3/2016 | Eyer | |
| 9,596,521 B2 | 3/2017 | Winograd et al. | |
| 9,602,891 B2 | 3/2017 | Winograd et al. | |
| 9,607,131 B2 | 3/2017 | Winograd et al. | |
| 9,639,911 B2 | 5/2017 | Petrovic et al. | |
| 9,681,203 B2 | 6/2017 | Winograd et al. | |
| 9,769,543 B2 | 9/2017 | Petrovic et al. | |
| 9,805,434 B2 | 10/2017 | Petrovic et al. | |
| 9,854,331 B2 | 12/2017 | Winograd et al. | |
| 9,854,332 B2 | 12/2017 | Winograd et al. | |
| 9,942,602 B2 | 4/2018 | Petrovic et al. | |
| 10,110,971 B2 | 10/2018 | Winograd et al. | |
| 2001/0044899 A1 | 11/2001 | Levy | |
| 2002/0032864 A1 | 3/2002 | Rhoads et al. | |
| 2002/0059622 A1 | 5/2002 | Grove et al. | |
| 2002/0078233 A1 | 6/2002 | Biliris et al. | |
| 2002/0094082 A1 | 7/2002 | Jones et al. | |
| 2002/0138695 A1 | 9/2002 | Beardsley et al. | |
| 2002/0168087 A1 | 11/2002 | Petrovic | |
| 2003/0012403 A1 | 1/2003 | Rhoads et al. | |
| 2003/0055979 A1 | 3/2003 | Cooley | |
| 2003/0065739 A1 | 4/2003 | Shnier | |
| 2003/0084294 A1 | 5/2003 | Aoshima et al. | |
| 2003/0103645 A1 | 6/2003 | Levy | |
| 2003/0193616 A1 * | 10/2003 | Baker .................. G11B 27/10 348/515 |
| 2003/0228030 A1 | 12/2003 | Wendt | |
| 2004/0039914 A1 | 2/2004 | Barr et al. | |

(56) References Cited

U.S. PATENT DOCUMENTS

| | | |
|---|---|---|
| 2004/0081079 A1* | 4/2004 | Forest .................. H03M 13/43 370/216 |
| 2004/0098370 A1 | 5/2004 | Garland et al. |
| 2004/0101160 A1 | 5/2004 | Kunisa |
| 2004/0202324 A1 | 10/2004 | Yamaguchi et al. |
| 2004/0250080 A1 | 12/2004 | Levy et al. |
| 2005/0071423 A1 | 3/2005 | Rajaniemi |
| 2005/0123169 A1 | 6/2005 | Wendt |
| 2005/0182792 A1 | 8/2005 | Israel et al. |
| 2006/0047704 A1* | 3/2006 | Gopalakrishnan ........................... G06F 17/30247 |
| 2006/0053292 A1 | 3/2006 | Langelaar |
| 2006/0062426 A1 | 3/2006 | Levy et al. |
| 2006/0083242 A1 | 4/2006 | Pulkkinen |
| 2006/0115108 A1 | 6/2006 | Rodriguez et al. |
| 2006/0239501 A1 | 10/2006 | Petrovic et al. |
| 2006/0239503 A1* | 10/2006 | Petrovic .................. H04L 9/002 382/100 |
| 2007/0003103 A1 | 1/2007 | Lemma et al. |
| 2007/0039018 A1 | 2/2007 | Saslow et al. |
| 2007/0071037 A1* | 3/2007 | Abraham .............. H04N 21/235 370/503 |
| 2007/0074266 A1* | 3/2007 | Raveendran ........... H04N 5/144 725/135 |
| 2007/0135084 A1* | 6/2007 | Ido ..................... G06Q 30/0241 455/355 |
| 2007/0208744 A1 | 9/2007 | Krishnaprasad et al. |
| 2007/0250560 A1 | 10/2007 | Wein et al. |
| 2008/0002854 A1 | 1/2008 | Tehranchi et al. |
| 2008/0037825 A1 | 2/2008 | Lofgren et al. |
| 2008/0263612 A1* | 10/2008 | Cooper .................. G11B 27/10 725/116 |
| 2008/0273644 A1* | 11/2008 | Chesnutt .................. H04L 7/08 375/370 |
| 2008/0288983 A1 | 11/2008 | Johnson et al. |
| 2008/0297654 A1 | 12/2008 | Verberkt et al. |
| 2008/0301304 A1 | 12/2008 | Chitsaz et al. |
| 2009/0010487 A1 | 1/2009 | Maeno |
| 2009/0028331 A1* | 1/2009 | Millar ................ H04N 7/17318 380/255 |
| 2009/0060055 A1 | 3/2009 | Blanchard et al. |
| 2009/0089078 A1* | 4/2009 | Bursey ................. G06Q 10/101 705/300 |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0037138 A1 | 2/2010 | Shcherbakov et al. |
| 2010/0054531 A1 | 3/2010 | Kogure et al. |
| 2010/0063978 A1 | 3/2010 | Lee et al. |
| 2010/0097494 A1* | 4/2010 | Gum ....................... G01S 19/14 348/231.5 |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2010/0325646 A1 | 12/2010 | Alhadeff et al. |
| 2011/0004897 A1 | 1/2011 | Alexander et al. |
| 2011/0058188 A1 | 3/2011 | Guo et al. |
| 2011/0088075 A1 | 4/2011 | Eyer |
| 2011/0099594 A1 | 4/2011 | Chen et al. |
| 2011/0103444 A1 | 5/2011 | Baum et al. |
| 2011/0161086 A1 | 6/2011 | Rodriguez |
| 2011/0164784 A1 | 7/2011 | Grill et al. |
| 2011/0188700 A1 | 8/2011 | Kim et al. |
| 2011/0252342 A1 | 10/2011 | Broman |
| 2011/0261667 A1 | 10/2011 | Ren et al. |
| 2011/0281574 A1* | 11/2011 | Patel .................. H04W 56/0015 455/422.1 |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0110138 A1 | 5/2012 | Zhang |
| 2012/0113230 A1* | 5/2012 | Jin ..................... H04N 13/0296 348/47 |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0007790 A1 | 1/2013 | McMillan et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0077699 A1* | 3/2013 | Gifford .............. H04N 21/4341 375/240.28 |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0159546 A1 | 6/2013 | Thang et al. |
| 2013/0171926 A1 | 7/2013 | Perret et al. |
| 2013/0188923 A1* | 7/2013 | Hartley .................... H04N 9/87 386/241 |
| 2013/0227293 A1* | 8/2013 | Leddy ...................... H04L 9/32 713/176 |
| 2013/0246643 A1 | 9/2013 | Luby et al. |
| 2013/0271657 A1* | 10/2013 | Park ........................ H04N 9/44 348/525 |
| 2013/0276046 A1 | 10/2013 | Park et al. |
| 2014/0037132 A1 | 2/2014 | Heen et al. |
| 2014/0047475 A1* | 2/2014 | Oh ..................... H04N 21/4355 725/40 |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1* | 3/2014 | Oh ................... H04N 21/25891 725/93 |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1* | 4/2014 | Stavropoulos ......... H04H 60/58 700/94 |
| 2014/0115644 A1 | 4/2014 | Kim et al. |
| 2014/0130087 A1* | 5/2014 | Cho .................. H04N 21/41407 725/34 |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0257744 A1* | 9/2014 | Lokshin ................ A61B 5/1123 702/141 |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0052571 A1* | 2/2015 | Stokking .............. H04N 21/242 725/116 |
| 2015/0063659 A1 | 3/2015 | Poder et al. |
| 2015/0071153 A1* | 3/2015 | Hong .................... H04L 5/0023 370/311 |

(56) References Cited

U.S. PATENT DOCUMENTS

| | | |
|---|---|---|
| 2015/0093016 A1 | 4/2015 | Jiang et al. |
| 2015/0121534 A1 | 4/2015 | Zhao et al. |
| 2015/0156536 A1 | 6/2015 | Kim et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0296274 A1 | 10/2015 | Good et al. |
| 2015/0324947 A1 | 11/2015 | Winograd et al. |
| 2015/0340045 A1 | 11/2015 | Hardwick et al. |
| 2016/0037189 A1* | 2/2016 | Holden .............. H04N 21/8358 725/116 |
| 2016/0055606 A1 | 2/2016 | Petrovic et al. |
| 2016/0055607 A1 | 2/2016 | Petrovic et al. |
| 2016/0148334 A1 | 5/2016 | Petrovic et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |
| 2017/0180809 A1* | 6/2017 | An ................... H04N 21/25891 |
| 2017/0251282 A1 | 8/2017 | Winograd et al. |
| 2017/0272839 A1 | 9/2017 | Winograd et al. |
| 2017/0280205 A1 | 9/2017 | Winograd et al. |
| 2017/0374434 A1 | 12/2017 | Petrovic et al. |
| 2018/0018748 A1 | 1/2018 | Petrovic et al. |
| 2018/0027306 A1 | 1/2018 | An et al. |
| 2018/0192163 A1 | 7/2018 | Winograd et al. |

FOREIGN PATENT DOCUMENTS

| | | |
|---|---|---|
| CN | 103533343 | 1/2014 |
| EP | 2439735 A1 | 4/2012 |
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 A | 7/2013 |
| KR | 1020130074922 | 7/2013 |
| KR | 101352917 B1 | 1/2014 |
| KR | 10201424049 | 7/2014 |
| WO | 9803014 | 1/1998 |
| WO | 00059148 A1 | 10/2000 |
| WO | 2005017827 | 2/2005 |
| WO | 2005038778 | 4/2005 |
| WO | 2006051043 | 5/2006 |
| WO | 2008045880 | 4/2008 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 A2 | 12/2012 |
| WO | 2013025035 A2 | 2/2013 |
| WO | 2013067439 | 5/2013 |
| WO | 2013163921 | 11/2013 |
| WO | 2014014252 | 1/2014 |
| WO | 2015138798 | 9/2015 |
| WO | 2015168697 | 11/2015 |
| WO | 2015174086 | 11/2015 |
| WO | 2016028934 | 2/2016 |
| WO | 2016028936 | 2/2016 |
| WO | 2016029055 | 2/2016 |
| WO | 2016086047 A1 | 6/2016 |

OTHER PUBLICATIONS

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

International Search Report and Written Opinion dated Aug. 13, 2015 for International Application No. PCT/US2015/029097, filed May 4, 2015 (14 pages).

International Search Report and Written Opinion dated Dec. 7, 2015 for International Application No. PCT/US2015/045960, filed Aug. 19, 2015 (14 pages).

International Search Report and Written Opinion dated Jan. 28, 2016 for International Application No. PCT/US2015/045964, filed Aug. 19, 2015 (8 pages).

International Search Report and Written Opinion dated May 28, 2015 for International Application No. PCT/US2015/020282, filed Mar. 12, 2015 (7 pages).

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

International Search Report and Written Opinion dated Mar. 15, 2016 for International Application No. PCT/US2015/062514, filed Nov. 24, 2015 (10 pages).

Office action dated Nov. 30, 2016 for Korean Patent Application No. 10-2016-7002289 (4 pages).

International Search Report and Written Opinion dated Jan. 21, 2016 for International Application No. PCT/US2015/046166, filed Aug. 20, 2015 (8 pages).

International Search Report and Written Opinion dated Apr. 12, 2016 for International Application No. PCT/US2015/066872, filed Dec. 18, 2015 (7 pages).

Office Action dated Jun. 10, 2016 for Korean Patent Application No. 10-2016-7002291 (19 pages).

Office Action dated Jun. 10, 2016 for Korean Patent Application No. 10-2016-7002289 (11 pages).

Furon, T., "A constructive and unifying framework for zero-bit watermarking," CS.MM, Jan. 12, 2007.

Extended European Search Report dated Sep. 21, 2017 for European Application No. 15762332.3 (9 pages).

Extended European Search Report dated Nov. 21, 2017 for European Application No. 15785628.7 (7 pages).

"ATSC Candidate Standard: Interactive Services Standard," ATSC Technology Group, Advanced Television Systems Committee, Dec. 2013 (139 pages).

Extended European Search Report dated Feb. 23, 2018 for European Application No. 15833741.0 (8 pages).

(56) References Cited

OTHER PUBLICATIONS

Extended European Search Report dated Mar. 5, 2018 for European Application No. 15834491.1 (8 pages).
Extended European Search Report dated Apr. 6, 2018 for European Application No. 15863968.2 (10 pages).
Partial Supplementary European Search Report dated Feb. 23, 2018 for European Application No. 15833725.3 (12 pages).
Office action dated Mar. 16, 2018 for Korean Patent Application No. 10-2017-7007558 (10 pages).
Office Action dated Oct. 9, 2018 for Chinese Patent Application No. 201580019496.X (8 pages).
Extended European Search Report dated Jun. 4, 2018 for European Patent Application No. 15833725.3 (11 pages).

* cited by examiner

CONTENT SYNCHRONIZATION USING WATERMARK TIMECODES

CROSS REFERENCE TO RELATED APPLICATIONS

This application claims the benefit of priority of U.S. Provisional Patent Application No. 62/039,547, filed Aug. 20, 2014, the entire contents of which are incorporated by reference as part of the disclosure of this document.

TECHNICAL FIELD

The subject matter of this patent document relates to management of multimedia content and more specifically to facilitate synchronization and utilization of multiple related multimedia content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21, TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

SUMMARY OF CERTAIN EMBODIMENTS

Figure 1:
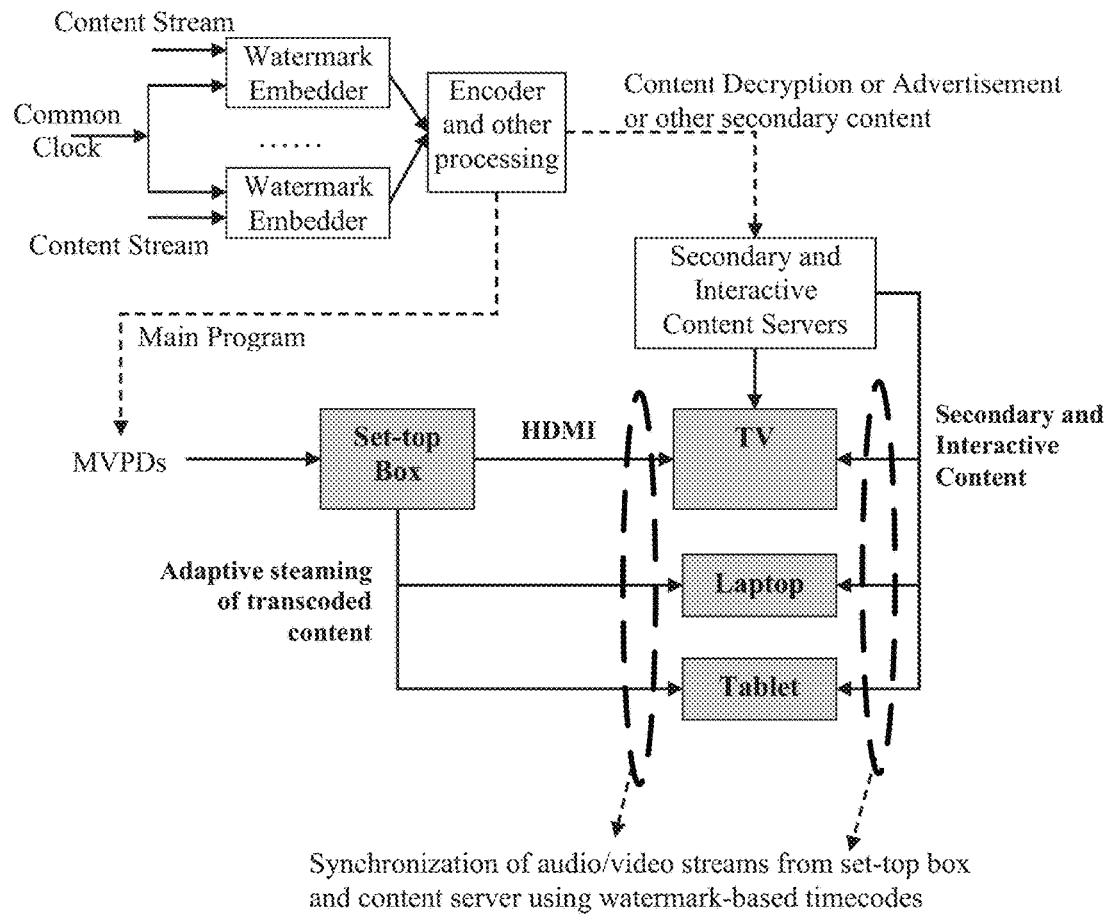
FIG. 1 illustrates an architecture for synchronization of multiple audio and video streams in hybrid and multiscreen content distribution in accordance with an exemplary embodiment.

The disclosed technology relates to the detection of watermarks that are embedded in a contents to allow proper synchronization between multiple contents or multiple components of a multimedia content.

One aspect of the disclosed embodiments relates to a method for synchronizing multiple contents that includes receiving a plurality of contents including a first and a second content, and performing watermark extraction operations on the first content to recover a first timecode that is incorporated as part of a watermark payload into a first segment of the first content, where the first timecode conforms to a first type of timing system. The above method further includes determining a timing system associated with the second content, and upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system. This method also includes synchronizing presentation of the second content with the first content using the mapping.

In one exemplary embodiment, the mapping is obtained from an external database that is identified based on at least a portion of the extracted watermark payload. In another exemplary embodiment, the first timing system is a fixed timing system that is based on a reference timeline that begins from an initially embedded watermarked segment of the first content and increments for each subsequent watermarked segment of the first content. In this exemplary embodiment, the mapping is a changeable mapping that allows conversion between the first timing system and a changeable second timing system. In yet another exemplary embodiment, the above noted method further includes obtaining one or more additional mappings that allow conversion of the first or the second timecodes to one or more additional timing systems associated with one or more additional contents so as to allow the one or more additional contents to be synchronized with the first segment or a subsequent segment of the first content, or with the corresponding section of the second content.

Another aspect of the disclosed embodiments relates to a device that includes a processor, and a memory including processor executable code. The processor executable code, when executed by the processor causes the device to receive a plurality of contents including a first and a second content, and perform watermark extraction operations on the first content to recover a first timecode that is incorporated as part of a watermark payload into a first segment of the first content, where the first timecode conforming to a first type of timing system. The processor executable code, when executed by the processor also causes the device to determine a timing system associated with the second content, and upon a determination that the timing system associated with the second content is a second timing system that is different from the first timing system, obtain a mapping that allows one or both of: a conversion of timecodes from the first timing system to the second timing system or a conversion of timecodes from the second timing system to the first timing system. The processor executable code, when executed by the processor further causes the device to use the mapping to synchronize presentation of the second content with the first content.

Another aspect of the disclosed embodiments relates to a computer program product, embodied on one or more non-transitory computer readable media, that includes program code for receiving a plurality of contents including a first and a second content, and program code for performing watermark extraction operations on the first content to recover a first timecode that is incorporated as part of a watermark payload into a first segment of the first content, where the first timecode conforms to a first type of timing system. The one or more non-transitory computer readable media also comprising program code for determining a timing system associated with the second content, and program code for upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system. The one or more non-transitory computer readable media further including program code for synchronizing presentation of the second content with the first content using the mapping

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

To mitigate the issues that can arise from the loss of content metadata that are carried in separate metadata channels is to embed watermarks into the content to enable automatic content recognition (ACR) and metadata recovery. Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like.

Once the embedded watermarks are detected by a watermark detector (also sometimes referred to as a watermark extractor), the payload of the watermark can be used to identify the content and recover the metadata associated with the identified content. In ACR applications, watermarks are often designed with a set of requirements that differ from requirements that are imposed on other watermark detectors, such as copy control watermark detectors. For example, in ACR applications it is critical to be able to recognize a content very quickly. After a content is recognized, the associated metadata can be recovered to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services. It is important to provide those additional content and metadata in a manner that is synchronized with the main or primary content segments. The disclosed techniques, among other benefits and advantages, enable synchronization of multiple contents using embedded watermarks. The multiple contents, or components thereof, may have no associated timing information, or may be associated with disparate timing standards.

FIG. 1 shows a system for synchronization of multiple audio and video streams in hybrid and multiscreen content distribution in accordance with an exemplary embodiment. Multiple streams (e.g., audio streams in multiple languages and video streams in multiple bitrates) of a content are embedded with watermarks according to a common clock. The timing information of the common clock is conveyed using the embedded watermarks. The embedded content can undergo additional encoding and processing and delivered to a client device (e.g., a TV, a laptop, etc.) for rendering and display via more than one transmission interface or protocol. For example, one stream may be delivered to a set top box that provides the content to a TV via an HDMI interface or to a laptop/tablet using adaptive streaming as a main or primary program (e.g., via WiFi or cable connection). In a separate path shown in FIG. 1, additional content processing/augmentation can take place. For example, content (e.g., audio or video) decryption can be performed, or advertisements or other secondary content can be incorporated. Such content is then provided to the secondary and/or interactive content servers, which allows the delivery of secondary stream (e.g., interactive content, audio description, multiple language audio streams, etc.) via another communication channel, such as broadband, to the client devices. The audio and video components of the main or primary content, as well as the associated components of the secondary content that are received at the client device must be properly synchronized with one another in order to provide a pleasant user experience, and to allow full utilization of the delivered content.

In some cases, a client device that receives such streams may be able to synchronize those streams based on the timing information in the streams, where such timing information can be based on a clock that is common to all streams. The timing information in the streams that may be delivered to the client using different transmission protocols, interfaces and/or channels is commonly incorporated into the format (e.g., ISOBFMM or MPEG-Transport Stream) of these streams. However, as noted earlier, such timing information that is carried as metadata of the stream, can be lost prior to reaching the client device because of various content processing and transmission procedures, such as format conversion and transcoding operations.

The following two examples illustrate scenarios in which a content must be transcoded at a home gateway for in-home redistribution, and the timing information is often lost during such transcoding.

1) Transcoding is needed due to audio or video format or codec incompatibility. In this scenario, an in-home device (such as a tablet or TV) that receives the redistributed content from a home gateway may not support advanced codecs such as High Efficiency Video Coding (HEVC) used for encoding the original video streams received by the home gateway from a multichannel video programming distributor (MVPD).

2) Transcoding is required by the distribution protocol. In this scenario, adaptive streaming such as Dynamic Adaptive Streaming over HTTP (DASH) or HTTP Live Streaming (HLS) is commonly used for content distribution over broadband. A home gateway may need to transcode each audio and video stream into multiple versions with different bitrates and package each version into segments. The transcoder also needs to ensure that the multiple versions of a segment are switchable for rendering at a client.

With the proliferation of in-home devices that can have different processing and compatibility profiles, as well as the development of new types of content delivery protocols and storage formats, it becomes more difficult, and sometime impossible, to manage the associated metadata including the timing information across all platforms, content formats and delivery protocols.

One aspect of the disclosed embodiments relates to methods, devices and computer program products that use digital watermark based on a common clock to synchronize multiple streams that may be distributed via different transmission methods (e.g., cable, satellite, broadband, or 3GPP), in some of which the timing information may be lost. The substantially imperceptible watermarks are designed to be detectable after various signals processing operations (e.g., transcoding, A/D and D/A conversions) and malicious attacks that attempt to remove them. The common clock can be a standard timing system, such as UTC (Coordinated Universal Time), LTC (Linear Timecode), VITC (Vertical Interval Timecode), PTP (Precision Time Protocol), NTP (Network Time Protocol) or GPS (Global Positioning System). In particular LTC is an encoding of SMPTE timecode data in an audio signal (defined in SMPTE 12M specification). The audio signal is commonly recorded on a VTR track or other storage media and the bits are encoded using the biphase mark code, where a zero bit has a single transition at the start of the bit period, and a one bit has two transitions, at the beginning and middle of the period. This encoding is self-clocking. Each frame is terminated by a 'sync word' which has a special predefined sync relationship with any video or film content. VITC is a form of SMPTE timecode embedded as a pair of black-and-white bars in a video signal. These lines are typically inserted into the vertical blanking interval of the video signal. There can be more than one VITC pair in a single frame of video, which can be used to encode extra data that will not fit in a standard timecode frame. PTP is a protocol used to synchronize clocks throughout a computer network. On a local area network, it achieves clock accuracy in the sub-microsecond range, making it suitable for measurement and control systems. NTP is a networking protocol for clock synchronization between computer systems over packet-switched, variable-latency data networks.

The watermark message portion for timing synchronization purposes includes a timecode that may be represented as a standard timecode such as LTC or PTP, a clock time provided by NTP or GPS, or a sequence of numeric codes (or counter) generated at regular intervals by, for example, a timing system or a counting system during watermark embedding. In one example, the embedded timecode is an incrementing counter. Watermark timecodes can be embedded into content streams at any upstream point before the streams reach a downstream device where synchronization of these streams is required. Once such a watermark is detected from a content segment, by knowing the length of the embedded watermarks (which is usually the case), the position of that content segment with respect to first embedded watermark (e.g., the start of the content) can be readily determined. Thus, the embedded counter value can operate as a timeline indicator of the content.

In one embodiment, the watermark timecodes are embedded into content streams within a camera device at real time during original recording and capturing of the content. In another embodiment, watermark timecodes are embedded into content streams prior to transmission of these streams. In yet another embodiment, watermark timecodes are embedded into content streams at a device such as a home gateway prior to or during performing a content processing (e.g., transcoding) that may result in loss of timing information in the processed streams.

In some scenarios, watermark timecodes may become discontinuous after editing the watermarked content, such as during cutting or composition of the content. As long as the discontinuous timecodes in all streams are synchronized, these streams can be still synchronized based on the discontinuous timecodes. If the edited streams require re-synchronization, new watermark timecodes can be embedded to overwrite the current timecodes or the new timecodes can be embedded in an additional watermarking layer that does not overwrite the existing timecodes, with a common clock.

Watermark timecodes may be embedded into the audio and video streams of a content in the same or different intervals. For example, if consecutive timecodes are embedded into every frame of a video stream with 24 fps and into every 4096 samples of an audio stream with the sampling rate at 48 KHz, the timecode interval in the video stream is 41.66 milliseconds (i.e., a new timecode is inserted every 41.66 ms) and the timecode interval in the audio stream is 21.33 milliseconds. To synchronize the audio and video streams, a translation or mapping of timecodes in the audio stream into the timecodes in the video stream or vice versa, is required. In the context of above example, assume that timecodes in the audio and video streams are incrementally generated starting from 0 using a common clock and X is a timecode in the audio stream for synchronization with the video stream. The end of the interval of the timecode X is approximately synchronized with the frame containing the timecode value round (X*21.33/41.66) in the video stream.

When two streams contain watermark timecodes that are generated based on two different clocks, a mapping between these two clocks is required to use the timecodes for synchronization between the two streams. If two timecodes in two stream share the same frequency (i.e., interval), a simple mapping is required (e.g., the timecode value 1000 in the first stream is corresponding to the timecode value 10000 in the second stream). Otherwise, two mappings are required: first, a mapping between two clocks is applied and then a translation between the timecodes embedded in the two streams are applied.

Watermark timecodes can co-exist with other timing system. In one embodiment, the timing information is embedded as watermark timecode in the first stream and carried as metadata in the second stream. If the watermark timecodes in the first stream and timing metadata in the second stream share the same timing system, synchronization of these two streams can be performed using the watermark timecodes and timing metadata. However, if these two streams use different timing system (e.g., the first stream uses counter while the second stream uses NTP), a mapping between two timing systems is required. For example, with a value 0 of the timecode corresponds 12:00:00:00 of a NTP time, two streams that contain timecode and NTP, respectively, can be synchronized by aligning the segment containing the timecode 0 in the first stream with the segment containing the NTP 12:00:00:00 in the second stream. Such mapping information can be delivered as metadata of the content streams or transmission protocol such as adaptive streaming DASH.

It should be noted that the disclosed embodiments allow the timing relationship between the timecodes that are embedded in a content with an arbitrary timing system or systems that can change at any time and can differ for differing applications. That is, the embedded timecodes, rather than being statically anchored a specific timing system (e.g., the real time clock value that specifies elapse of time from a particular reference value), can be dynamically mapped to an arbitrary timing system as provided by, for example, the metadata that resides at a remote database. A receiver device, upon ascertaining the timecode value that is part of the extracted watermark payload, can use part of the watermark payload to locate and communicate with a remote database server, and obtain the appropriate mapping for conversion of the extracted timecode to a particular timing system. As such, temporal association of content segments with other contents or content components can be modified at future times, and for different types of associated secondary content by simply updating the timecode mappings.

One exemplary method for providing synchronization information for multiple components associated with a multimedia content includes obtaining a multimedia content that includes a plurality of components and embedding a watermark message comprising timecodes into two or more of the components. The embedded multimedia content to can then be provided to a transmitter or to a non-transitory storage medium for subsequent transmission of the multimedia content. Upon reception of the multimedia content and extraction of the embedded watermarks from each of the embedded components of the multimedia content, the embedded components of the multimedia content can be synchronized based on the extracted watermarks from each of the embedded components. Such a multimedia content can include at least one audio component and at least one video component, and at least one of each of the video components and the audio components are embedded with watermarks that include the timecodes. The timecodes embedded in each component of the multimedia content can related to one another according to a mapping.

In one exemplary embodiment, the timecodes that are embedded in each of the components are generated based on at least one clock, which can be common clock. The timecodes can also be embedded based on different clocks. In this case, upon extraction of timecodes from each of the components, a mapping between the different clocks is applied and then a translation between the timecodes embedded in the components is carried out. Timecodes can further be included in a metadata stream associated with the multimedia content.

Another method for synchronizing multiple contents includes receiving a multimedia content that includes a plurality of components and obtaining timing information comprising timecodes from a plurality of components of the multimedia content. Obtaining the timecodes includes extracting embedded watermarks including the timecodes from at least one of the plurality of components. Once the timecodes are obtained, the first timecode that is obtained from a first component is mapped to a produce a second timecode corresponding to a second component. Using the second timecode, the segment of the first component comprising the first timecode is synchronized with a segment of the second component that includes the second timecode. In one exemplary embodiment, the produced second timecode is an estimate of the timecode that is obtained from the second component.

As noted earlier, after a content is recognized, the associated metadata can be recovered (e.g., from an affiliated database) to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services. It is important to provide those additional content and metadata in a manner that conforms to the changes in the main content presentation, including pauses, fast forward, skip, channel change and others. For instance, when a channel change occurs, the associated secondary content (e.g., an interactive content, an advertisement, etc.) may need to be modified, as well. In other examples, the associated secondary content may need to be stopped, modified or in some cases maintained without any change depending on the type of user action that is taking place. The following scenarios illustrate how the secondary content presentation can be affected base on the type of content interruption. When a user decides to access the program guide while viewing a particular content, part of the main video program can be obstructed by the program guide information that is displayed as an overlay, while the audio content remains uninterrupted. In some implementations, the program guide and the main video program are presented in a picture-in-picture (PIP) format, in two separate windows, which typically causes the main window to shrink. In another scenario, an interruption in the audio playback can occur when a user mutes the audio while viewing a main program uninterrupted. When a secondary content is also being presented in association with the main content, such interruptions may necessitate different changes to the presentation of the secondary content, as well. For example, when a program guide is being viewed, presentation of the secondary content may need to be paused, or presented as a semi transparent overlay, in order to allow proper viewing of the program guide. On the other hand, when a program is muted, the presentation of a secondary content may continue uninterrupted.

As an initial step in enabling the proper presentation of the secondary content, the gaps or interruptions in the presentation of a main content must be quickly recognized. As illustrated from the above examples, identification of the type of gaps (or actions that caused such gaps) can further trigger acquisition of new or additional secondary content or to modify the presentation of an existing secondary content.

Another aspect of the disclosed techniques, among other benefits and advantages, enable identification of discontinuities in a multimedia content that is being rendered or presented, and based on the detected gaps or discontinuities further trigger changes in presentation or acquisition of an associated, if such changes are needed.

A content discontinuity can be manifested by an abrupt change of content essence, content characteristics and/or content metadata. Such changes can be caused by content processing operations (e.g., advertisement replacement, splicing) or by user actions (e.g., channel switch or trick plays—e.g., fast forward, skip, pause—overscan or underscan, aspect ratio change). Such operations can be performed by an upstream device, such as a set-top box that presents the processed content to a downstream device, such as TV. Note that overscan refers to a scenario in which not all of a televised image is presented on a viewing screen, causing one or more edges of the original image to remain outside of the viewing area. Therefore, in the case of overscan at least a portion of the video image is truncated, which can cause lead to failures in watermark detection. Underscan refers to a scenario in which the screen includes a larger area than the original image, often in the form of blank (e.g., black) borders around the main image. In case of underscan, at least a portion of video content (e.g., a blank portion) can resemble a content interruption.

Detection of content discontinuities is important to a downstream device for many applications, e.g., interactive applications, hybrid content delivery (by combining cable/satellite and broadband), multiscreen content distribution (e.g., a home gateway distributes content to TV, PC and mobile devices) and others. It should be noted that in the context of this patent document, content discontinuity does not include the normal content transitions, such as scene changes, that are part of the original content. Further, in this the terms content discontinuity and content gap are sometime used interchangeably to denote interruptions in the content's playback or rendering.

Referring back to the exemplary system in FIG. 1, content metadata may be lost at a downstream device after content redistribution and/or processing at upstream devices. The following scenarios provide three examples in which at least part of the content metadata may be lost. (1) Content is distributed via a transmission interface or protocol (e.g., HDMI, DVI, DLNA, DASH) through which not all metadata of the content is transmitted from a upstream device (e.g., a cable set-top box) to a downstream device (e.g., a TV). (2) In a 3D viewing metadata, where viewer metadata defines spatial viewing parameters of the viewer with respect to the 3D display, such as viewing distance or inter-pupil distance. Source 3D image data arranged for a source spatial viewing configuration is processed to generate target 3D display data for display on the 3D display in a target spatial viewing configuration. Information such as spatial viewing parameters of the viewer with respect to the 3D display, viewing distance or inter-pupil distance may not be communicated to the 3D viewing device. (3) Object-oriented audio metadata may not be transmitted to a downstream device if the transmission interface or protocol (e.g., HDMI) doesn't support it.

According to some embodiments, content discontinuity detection can be carried out based one or more of the following three types of changes in a content stream that is received by a downstream device: (1) a change in content metadata (which, as will be described in the following, can be obtained from content transmissions, or recovered); (2) Interruptions in content essence or content characteristics; and/or (3) Interruption in watermark information that is embedded in the content. In many scenarios, not all of the above three sources for identifying content interruptions are available. For instance, content metadata can be lost due to normal content processing and transformation operations.

Detected changes in each of the above-identified sources alone (i.e., metadata, content essence/characteristic and watermark detections) may lead to false detection of content discontinuity. For example, silence in the content essence (e.g., naturally-occurring silent sections of a video content) may be falsely identified as a content interruption, or a false watermark may lead to a false identification of a content interruption due to, e.g., a channel change. Therefore, it is desirable for a downstream device to use more than one source to improve the reliability of content discontinuities detection and identification of the causes of those discontinuities.

In one exemplary embodiment, a combination of different techniques is used to improve the reliability of detection of content discontinuity. In this embodiment, a change of content metadata being transmitted with content such as of Transition-minimized Differential Signaling (TDMS) clock change or AVMUTE transmission of HDMI received at the downstream device identifies a gap. Additionally, the received content (audio and/or video) analyzed to further identify the presence of the gap. When a gap is identified based on both metadata change detection and content analysis at the approximate temporal position of the content, a content discontinuity is confirmed.

In another exemplary embodiment, the content is embedded with watermarks having a counter (or a timecode) as part of the watermark payload. When the embedded watermarks are extracted from the received content, a discontinuity in the detected watermark timecodes can be indicative of a content discontinuity. If the detected discontinuity is at approximately the same temporal position of the content where a content gap is detected using another source (e.g., using metadata such as TDMS clock or AVMUTE), a content discontinuity is confirmed. In some examples, detection of a weak watermark (or a series of weak watermarks) with continuous timecodes can also be indicative of a content interruption, such as when a content is partially muted (e.g., half-mute) for audio watermark or when a semitransparent video overlay partially obscures the displayed video frames for video watermark. A weak watermark is typically detected when the detected watermark message includes more than a certain number of threshold errors. Such a threshold is indicative of detection of a watermark message with a predetermined level of desired reliability.

In another exemplary embodiment, the content may be subjected to a fingerprinting process, in which the content is divided into segments and certain inherent characteristics of the content segments are computed. Examples of such content characteristics include content energy, content frequency features, temporal characteristics and others. The computed fingerprints are typically converted to, or mapped to, a compact form and indexed (e.g., through computation of a hash value) for storage in a database. When the content is subsequently disseminated and received at a receiver device, fingerprints are computed for the received content (e.g., on a segment-by-segment basis) and compared to the stored fingerprints to identify the content and/or detect any missing or altered content segments. Content gaps that are determined using fingerprints can compliment gap detections that are obtained using other techniques. For example, when a discontinuity in watermark timecodes (or presence of a series of weak but continuous watermark timecodes) is detected at approximately the same temporal position of the content where a mismatch or a weak match of computed fingerprints occurs, a content discontinuity is confirmed.

In this patent document, the term content essence is used to convey the audio and/or visual components of a multimedia content. Fingerprinting techniques allow identification of the content using the content essence, whereas watermarking techniques rely on the presence of a foreign signal (i.e., the watermark signal) that is embedded into the content. It should be noted, however, that because an embedded watermark is a low-level signal that is imperceptibly embedded into a host content, it typically does not interfere with computation of fingerprints. That is, fingerprints that are computed using a watermarked version of a content are substantially similar to those computed using an unmarked version of the content.

The following provides some examples as to how content discontinuity can be detected based on changes in the metadata. In one exemplary embodiment where metadata is available to a downstream device, a timestamp value that is part of a metadata stream (such as Presentation Timestamp in MPEG-2 Transport Stream or Element Stream) is used detect a content discontinuity. For example, changes in the timestamp value that do not conform to an expected pattern of timestamps (e.g., a continuously incrementing timestamp) can be used to detect the presence and the extent of a discontinuity in the content. In other examples, a change in one or more of the following fields or parameters in a content metadata stream is used to detect a discontinuity: color depth, black/white levels, scan information (overscan or underscan), picture aspect ratio, video format (e.g., 1080p or 720p), audio sample rate or channel count change, (unstable) TDMS clock (including clock interruption), or AVMUTE signal. It should be noted that this information may be available to the receiving device as part of metadata provided to a downstream device (e.g., a client device) over an HDMI interface.

The following non-exhaustive examples describe how content discontinuity can be detected based on interruptions in content essence, including content discontinuity that is detected in one or more content streams (e.g., audio, video and closed caption streams). In one exemplary embodiment, content discontinuity determination is conducted based on detected temporal locations of content interruptions for different streams. For example, a content is designated as entering a discontinuity state caused by channel change when one or more of the following conditions are satisfied: (1) the energy level of the audio component is below a predetermined threshold for a predetermined period of time (T1), (2) the energy level of each component (e.g., YUV, RGB) of the video component (e.g., measured by histogram concentration) is below a predetermined threshold for a predetermined period of time (T2), and/or (3) T1 and T2 overlap and overlapping period is greater than a first predetermined threshold but less than a second predetermined threshold. The first threshold value improves the reliability of gap detection by ensuring that a sufficiently long overlap period is detected prior to signaling a content interruption. The second threshold value excludes content interruption cases where discontinuity is not caused by channel change. For a channel change, content discontinuity typically lasts for 0.5 to 3 seconds. Thus, the first and the second threshold values can be set to approximately at 0.5 and 3 seconds, respectively.

As noted earlier, in some embodiments, discontinuity detection in each component can identify the nature of discontinuity, and trigger the appropriate actions in connection with presentation or modification of an associated secondary content. For example, the detection of a low (or no) audio energy level in combination with sufficient video energy level can be indicative of a mute operation. In some implementations, detection of the muted audio can further cause a secondary content to be muted as well, while in other exemplary implementations, such a detection can have no effect on the audio level of the secondary content.

In some exemplary embodiments, content discontinuity is detected using fingerprints. In particular, detection of content discontinuity comprises computing one or more fingerprints from the one or more continuous content segments, and transmitting the computed fingerprints to a fingerprint database. The fingerprint database comprises stored fingerprints and associated segments identified by content timing information or an identifier for a plurality of contents to allow determination of discontinuity by detecting a mismatch between the computed fingerprints with the stored fingerprints. In an alternate embodiment, once a content is identified, the fingerprint information is communicated from the external database to the device, and discontinuity detection is carried out at the device.

The following non-exhaustive examples illustrate how content discontinuity can be detected based on detection of watermarks that are embedded in content. When watermark messages that are embedded in content includes continuous timing information of the content, an interruption in such timing information detected by a downstream device can indicate a content discontinuity. In these examples, a watermark message includes a timecode, and/or a counter. Such a timecode, for example, may convey a standardized time value such as a Linear Timecode (LTC), a Precision Time Protocol (PTP), a clock time provided by the Network Time Protocol (NTP) or a Global Positioning System (GPS). In a more general sense, such a timecode may be a sequence of numeric codes generated at regular intervals by, for example, a timing system or a counting system during watermark embedding. Watermark timecodes can be embedded into content streams at any upstream point before the streams reach a downstream device where detection of a content discontinuity is needed. In one embodiment, the watermark timecodes are embedded into content streams within a camera at real time during original recording and capturing. In another embodiment, watermark time codes are embedded into content streams prior to transmission of these streams at a TV network or a local TV station.

An interruption in a detected watermark timecode that exceeds a predetermined threshold value or does not conform to an expected pattern of timecodes can produce an indication that a signal discontinuity is detected. If more than one component of a content (e.g., an audio and a video component) is embedded with watermarks, content discontinuity can be ascertained based on discontinuities detected from watermarks in each of the components separately, and/or jointly based whether or not an overlap between the temporal occurrences of the discontinuities exists, and the extent of such overlap (as described earlier).

The disclosed techniques also enable recovery of metadata from various sources. As noted earlier, such metadata may have been lost due to various content processing and format conversions. Moreover, certain content features may not have had a corresponding metadata field even if the content metadata were not lost. Therefore, the disclosed techniques also provide enhanced metadata capabilities that may not be present in any standardized metadata stream.

To facilitate the understanding of the disclosed metadata recovery techniques it is beneficial to briefly discuss some transmission interfaces or protocols that provide certain metadata to a be delivered from an upstream device to a downstream device. In particular, content transmission interfaces can be generally categorized based on the following.

Physical AV Interface: This interface includes defined electrical (or optical) hardware connectors dedicated to carrying audio signal and video signals such as HDMI, DVI, and Components.

Network AV Protocol: This protocol is a proprietary or standardized protocol that allows transmission of audiovisual content (compressed or uncompressed) from one device to another device using generic networking connections (such as Ethernet, WiFi, WiFi Direct, Bluetooth or coaxial cabling) for the purposes of remote display or remote rendering/display of such audiovisual content. Examples of the Network AV Protocols include DLNA, WiDi/Miracast, BlueTooth A2DP, adaptive streaming protocols such as DASH (Dynamic Adaptive Streaming over HTTP) and HLS (HTTP Live Streaming). A downstream device can receive various metadata using the above protocols or interfaces. Further, the disclosed techniques allow the recovery and augmentation of metadata that may be missing.

The following describes some example for metadata recovery based on HDMI signals. In one example, HDMI General Control Packet is used to transmit the following metadata from a HDMI source (e.g., an upstream device) to a HDMI sink (e.g., a downstream device): (1) Color depth; (2) Black and white levels (e.g., full range or limited range); and (3) indication of TDMS clock change or interruption (e.g., using AVMUTE function by the Source). HDMI can also support transmission of content identifiers such as UPC/EAN or ISRC. Various metadata associated with a video stream that is being provided from an HDMI source to a sink can be indicated using a Video Auxiliary Video Information (AVI) InfoFrame such as (1) Pixel encoding format (RGB or YCbCr); (2) Scan Information (e.g., overscan or underscan); (3) Colorimetry; (4) Picture aspect ratio (e.g., 4:3, 16:9); (5) Video format (e.g., 1920×1080i or 120×720p, 2D or 3D); and (6) Content Type (e.g., unknown, graphics, photo, cinema, game). Audio InoFrame is transmitted from a HDMI source to a sink when a new audio streams starts, or some aspects of the audio stream (e.g., channel count, sample size, sample rate) is changed. Content protection status indicated by HDCP. For example, start or end of an HDCP authentication process may indicate a change of the link protection status of the content to be transmitted.

In some exemplary embodiments, metadata is detected from content essence. For example, in one implementation, video and/or audio fingerprints are computed for a received content and used to detect video segments such as advertisements. In another example, face and object recognition techniques are used to detect sections of the content that include those features, and thus recover at least a portion of the metadata that describes those objects in the video. In another example, metadata indicative of scene changes are recovered (or confirmed) by applying video histogram analysis, fade detection and other techniques to a received content to identify the locations and types of those content features. Fades can be added during post production, or as part of content distribution, when audio or video components are processed to smooth out certain abrupt transitions between the audio or video segments. Such abrupt transitions may be caused by different shots, compositions of different content, or insertion or replacement of advertisement for targeted advertising.

Metadata can be further recovered using an external metadata database indexed by the fingerprints of the content. Once a content is received and its fingerprints are computed (e.g., segment-wise fingerprints), content segment can be identified using the fingerprint database. If the database includes content metadata (or identifies another database where the metadata resides), the associated metadata can also be retrieved and delivered to a downstream device.

In some exemplary embodiments, metadata recovery is carried out using watermarks that are embedded in the content. In particular, a downstream device extracts watermark messages that are embedded in a content. The embedded watermarks can be used to identify or access an external databased that includes associated content metadata. Such metadata can be communicated to the downstream device, for example, on a segment-by-segment basis.

Figure 2:
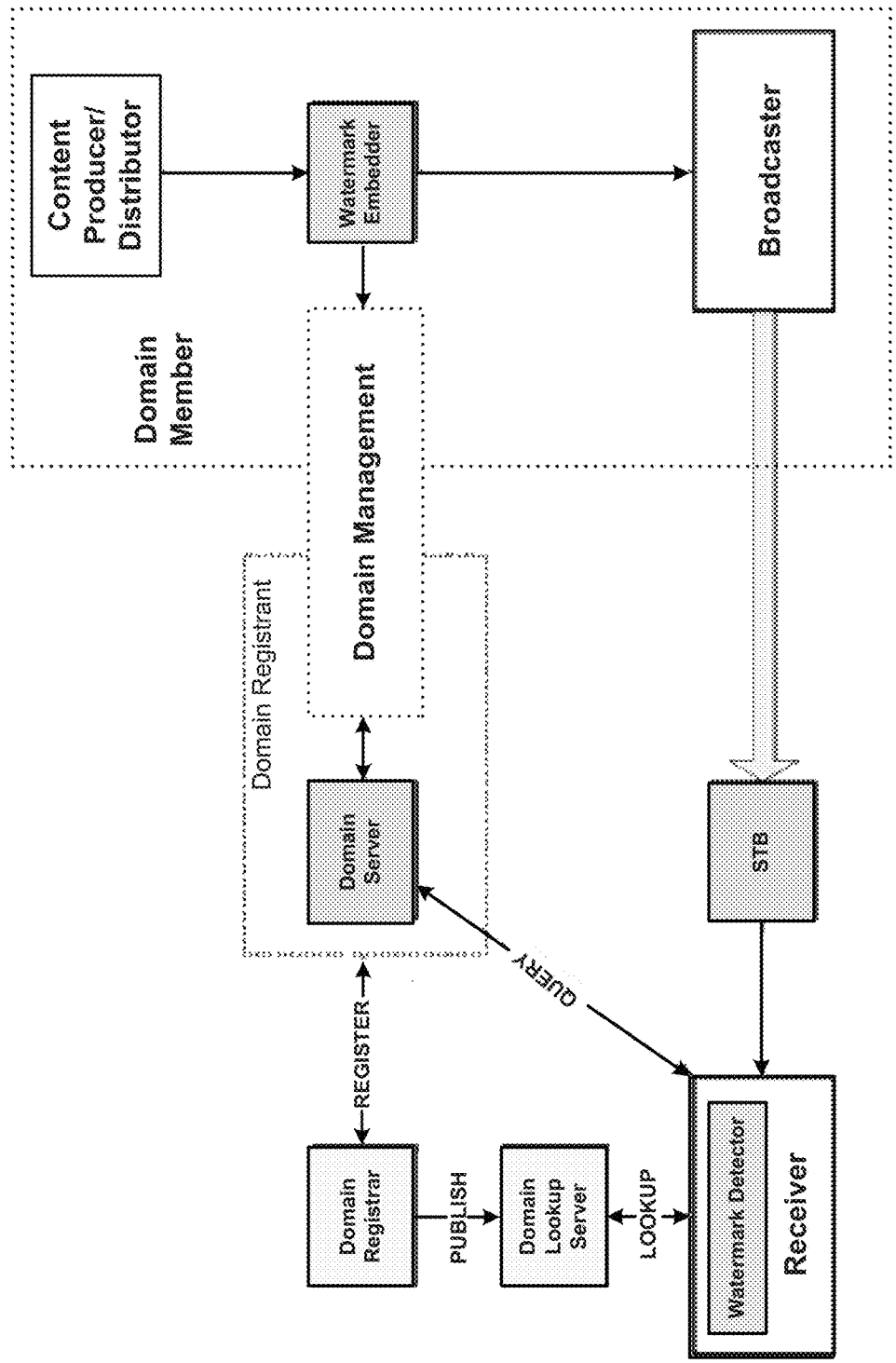
FIG. 2 illustrates a system for providing automatic content recognition and acquisition of interactive content in accordance with an exemplary embodiment.

FIG. 2 illustrates a system for providing automatic content recognition for content that is provided by a broadcaster to a consumer device and acquisition of interactive content that can be used for accommodating the disclosed embodiments. The system of FIG. 2 is one example of an ecosystem that can accommodate, and benefit from, the disclosed content synchronization techniques using the embedded timing information. The system of FIG. 2 can also accommodate, and benefit from, the disclosed content gap detection and metadata recovery techniques. The system of FIG. 2 is compatible with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) (S33 Doc. 067r3).

The content in FIG. 2 is embedded with watermarks by a Domain Member prior to broadcast. For example, such a Domain Member can be a content producer or a Broadcaster (which can also be called a Redistributor). A Broadcaster transmits the content to one or more user premises. Such content is often received at a receiver such as a set top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks. Such a detector can obtain the embedded timecodes from the recovered watermarks to enable content synchronization in accordance with the disclosed embodiments. The detection of watermarks may trigger further actions such as identifying a domain name associated with the detected watermark payload and sending a query to an identified domain server.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 2 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 2) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 2) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 2) to provide domain name mappings from the database in response to Domain ID lookup queries originated by the Receivers. The use of a standardized LOOKUP protocol allows interoperability between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 2). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Example Watermark Payload:

In one example implementation, a 50-bit payload can be embedded in every 1.5 seconds of the content. In this example, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload. The payload structure for each payload type can be further defined according to the following example format:

Small Domain: [Domain field:30 bits][Sequence field:17 bits][Trigger field:1 bit]

Medium Domain: [Domain field:22 bits][Sequence field:25 bits][Trigger field:1 bit]

Large Domain: [Domain field:18 bits][Sequence field:29 bits][Trigger field:1 bit]

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), can inform the Receiver of an event that may activate the Receiver to perform various operations such as requesting metadata from the domain server. It indicates that further services or features, such as interactive content or advertising insertion associated with the Sequence ID should be available to the Receiver from the domain server associated with the payload's Domain ID. In some implementations the trigger field can include multiple bits.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

Using the above watermark payload structures, if we assume that a watermark payload has temporal duration of 1.5 seconds, over 250,000 Large Domains can be identified (e.g. for long-term continuous embedding) that would allow 25.5 years of uniquely marked content per domain. This structure further allows over 4 Million Medium domains to be uniquely identified (e.g. for continuous marking of Olympics-scale events, annual channel assignments, or long-term selective embedding) that would allow 1.5 years of uniquely marked content per domain. The structure for Small Domains allows unique identification of over 1 Billion Small Domains (e.g. shows) with 54 hours of uniquely marked content per domain. Depending on the payload type, a domain may be assigned to one or more 1) broadcasters or content producers; 2) MVPDs; 3) channels; 4) sport events; 5) shows; 6) movies; or 7) episodes.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Once embedded into a host content, the embedded host content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 3:
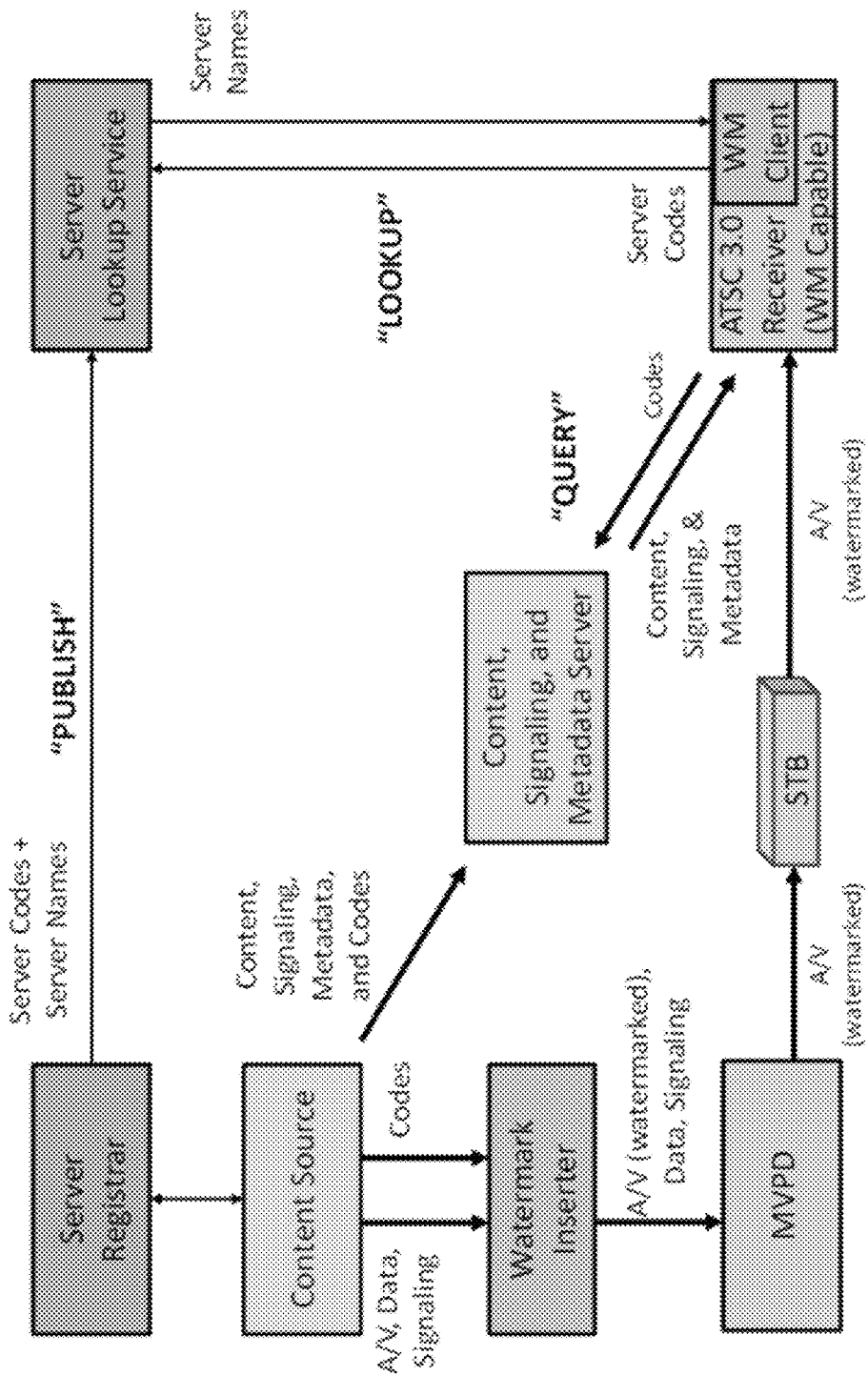
FIG. 3 illustrates another system and associated components that enables automatic content recognition and acquisition of corresponding metadata in accordance with an exemplary embodiment.

FIG. 3 provides another exemplary system that can accommodate, and benefit from, the disclosed content synchronization, gap detection and metadata recovery techniques, while conforming to ACR requirements of ATSC 3.0. Several components that are shown in FIG. 3 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 3 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. The CSM server can also include one or more mappings that allows conversion between different timing systems in accordance with the disclosed embodiments. It should be noted that while metadata services can be hosted in the same servers as the content and signaling services, they may alternatively be hosted on different servers from those used for content and signaling services.

To enable the architecture that is depicted in FIG. 3, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

ATSC Receivers may obtain broadcast content essence absent the full ATSC broadcast stream from an MVPD via a STB. The ATSC receiver may provide the content essence to the watermark client for detection of any embedded codes. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content that it receives, it checks to determine whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy. The disclosed techniques can improve synchronization between the broadcast time and media timecodes by using the embedded watermark timecodes.

Figure 4:
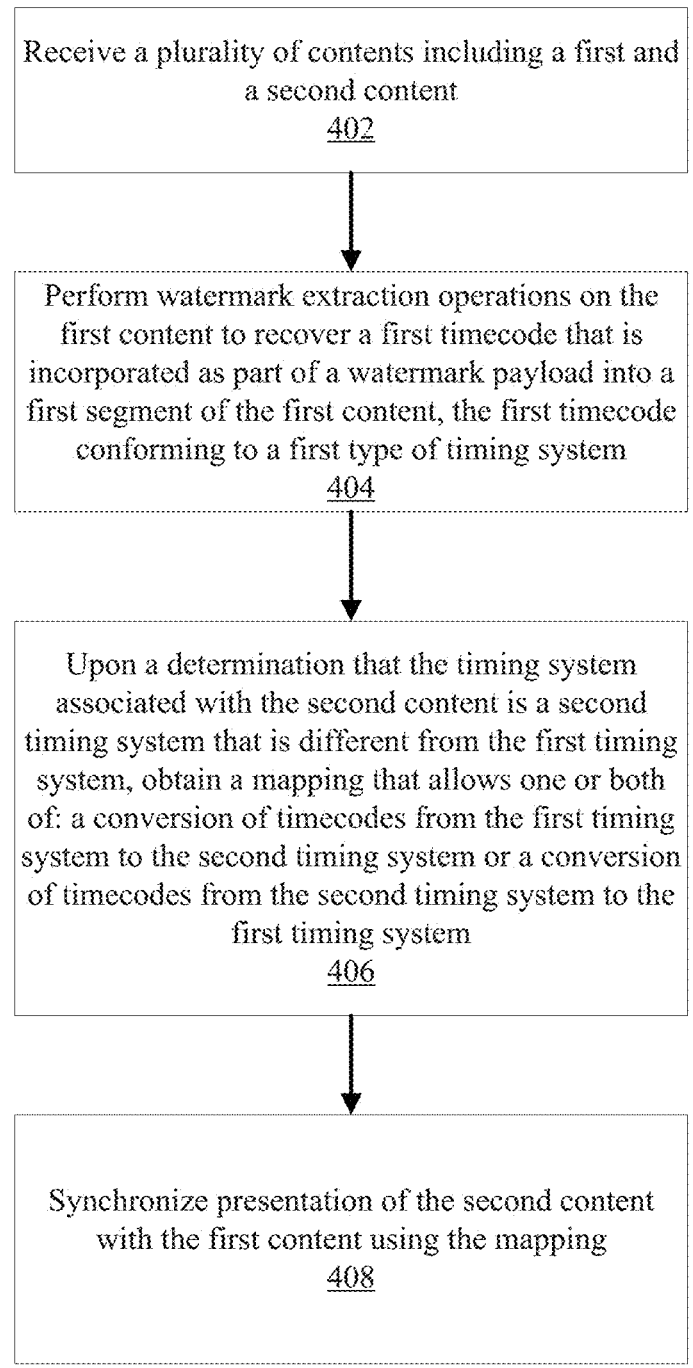
FIG. 4 illustrates a set of operations that can be carried out for synchronizing multiple contents in accordance with an exemplary embodiment.

FIG. 4 illustrates a set of operations that allows synchronization of multiple contents in accordance with an exemplary embodiment. At 402, a plurality of contents including a first and a second content is received. At 404, watermark extraction operations are performed on the first content to recover a first timecode that is incorporated as part of a watermark payload into a first segment of the first content, where the first timecode conforms to a first type of timing system. At 406, upon a determination that the timing system associated with the second content is a second timing system that is different from the first timing system, a mapping is obtained that allows one or both of: a conversion of timecodes from the first timing system to the second timing system or a conversion of timecodes from the second timing system to the first timing system At 408, presentation of the second content is synchronized with the first content using the mapping.

Thus, the above noted method enables accurate synchronization of multimedia content, which is required for rendering and presentation of the multiple contents (e.g., multiple components such as audio and video, secondary audio tracks, or multiple programs such as TV program, interactive content, or advertising content). Such multiple contents may be provided by, or obtained from, heterogeneous sources such as over-the-air broadcast, broadband, mobile networks, local storage, or networked devices. The following examples illustrate some scenarios where synchronization is required for rendering the content having heterogeneous sources: 1) inter-media synchronization where content streams (e.g., from different sources) are rendered on a single device simultaneously or alternately through splicing or overlay; or 2) inter-device synchronization where one content is presented on one device while another content associated with the content is rendered on another device in a synchronized fashion.

In some embodiments, the above noted first timecode that is obtained from the first content is a particular counter value that identifies the first segment of the first content relative to a reference location within the content's timeline. For example, such a counter can be part of the watermark payload's Sequence ID or Interval Code that were discussed earlier in connection with FIGS. 2 and 3, respectively. Such a counter can alternatively be part of a different field of the watermark payload. In some exemplary embodiments, the second timing system provides timing information according to one of the following timecode formats or protocols: a coordinated universal time (UTC), a linear timecode (LTC), a vertical interval timecode (VITC), a precision time protocol (PTP), a network time protocol (NTP), or a global positioning system (GPS). In some implementations, determining the second timing system includes analyzing a metadata stream associated with the second content to discern a type of timing system associated with timecodes of the second content. In another implementation, determining the second timing system includes extracting a watermark message from the second content to discern a type of timing system associated with timecodes of the second content.

According to some embodiments, the first content and the second content are different components of a multimedia content. For example, the first and second contents can be classified according to the following: (a) the first content is an audio component and the second content is a video component, (b) the first content is an video component and the second content is an audio component, (c) the first content is a television program and the second content is an advertisement, (d) the first content is a main audiovisual program and the second content is an interactive content, or (e) the first content is a main audiovisual program and the second content is a either an alternate or a supplemental audio, video or audio visual content, such as a second language content. In still another exemplary embodiment, the first content is a main content received at consumer electronic device and the second content is a secondary or interactive content associated with the main content. For example, the first content and the second content can be delivered to the consumer electronic device through different communication channels.

Figure 5:
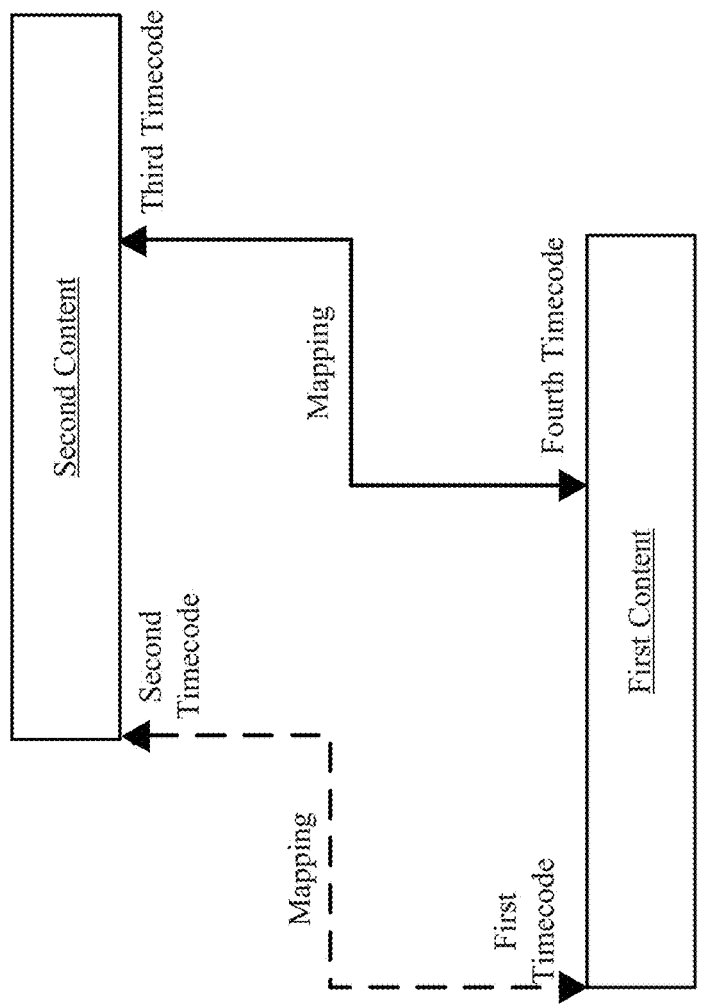
FIG. 5 shows a simplified diagram of multiple timecodes that are mapped in accordance with an exemplary embodiment.

In one exemplary embodiment, synchronizing includes using the mapping to convert a third timecode that conforms to the second timing system to a fourth timecode that conforms to the first timing system, and presenting the portion of the second content associated with the third timecode in synchrony with the presentation of the portion of the first content associated with the fourth timecode. FIG. 5 shows a simplified diagram of multiple timecodes that are mapped in accordance with an exemplary embodiment. As shown in FIG. 5, a second timecode associated with a particular segment of a second content is mapped to a first timecode associated with a first segment of the first content. For simplicity, FIG. 5 shows the first and second timecodes corresponding to the beginning segments of the first and second contents, respectively. However, this need not be case in all embodiments, and such segments can be positioned at any position within the respective contents. FIG. 5 further shows that the third timecode that is associated with another segment of the second content is mapped to a fourth timecode associated with one section of the first content. As noted earlier, the mappings can be carried out in either direction. For example, the mapping can allow conversion of the second timecode to the first timecode and vice versa.

In still another embodiment, the first timecode and the second timecode are generated based on a first clock and a second clock, respectively, and the mapping includes converting the first clock to the second clock, or the second clock to the first clock.

In some embodiments more than one mapping is obtained. For example, a first mapping can be applicable for conversion between the first and second timing systems, and a second mapping can be applicable for conversion between the second and a third timing system. In some embodiments, one of the multiple mappings (e.g., the first mapping) is always designated for converting a particular timing system to the timeline of the content. As described earlier, such a content timeline, in the simplest form, can be constructed by including an incrementing counter in the watermark payloads that are embedded in the content. Such a timecode, along with the knowledge of the watermark interval or duration, allows any segment of the content to be identified with respect to the starting location of the marked content. In the embodiments where one mapping is designated for conversion to such content timeline, other mappings can be used for conversion of the watermark timecode value to the other watermarked component timelines or between the different component timelines.

Figure 6:
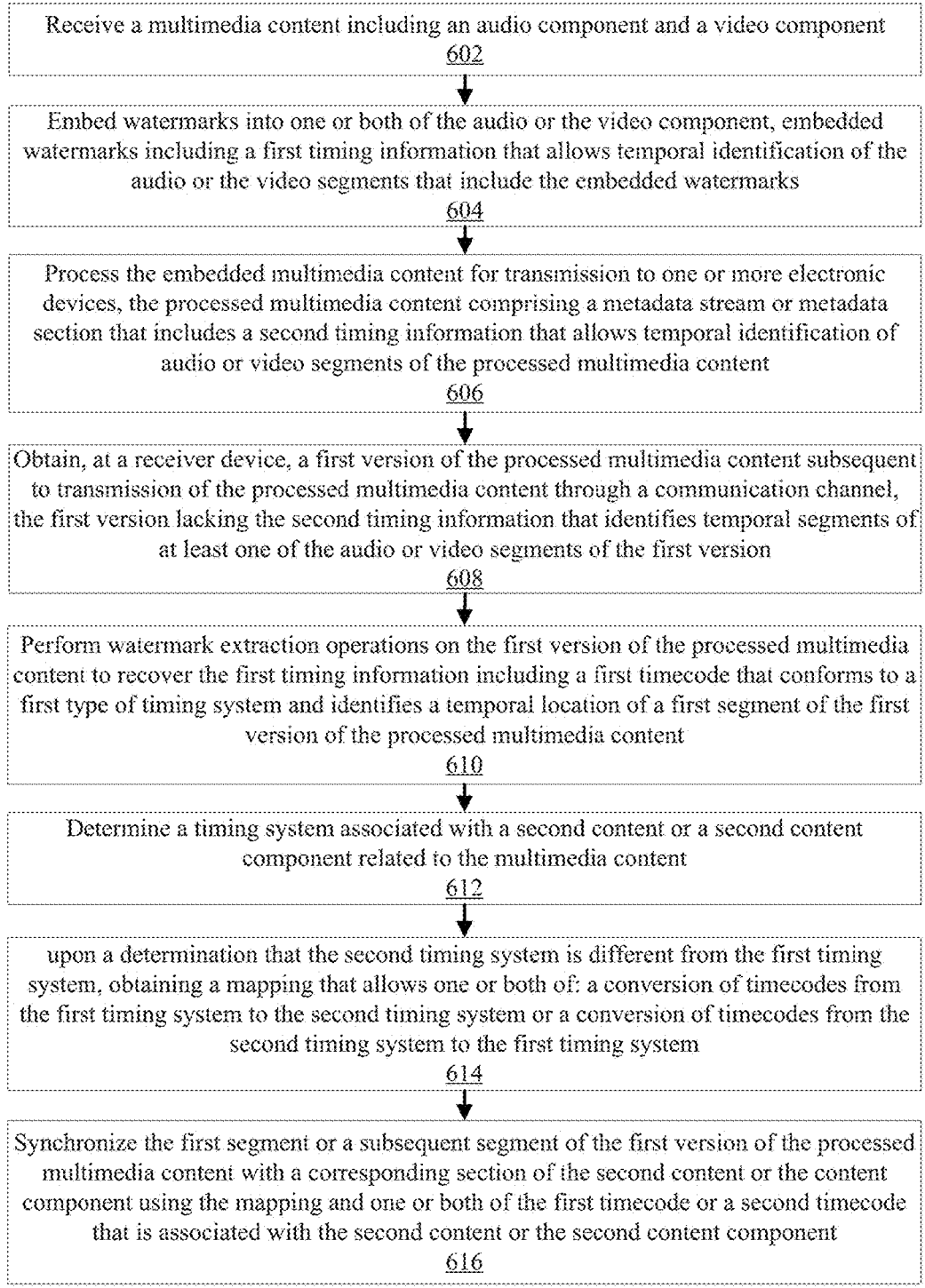
FIG. 6 illustrates another set of operations that can be carried out for synchronizing multiple contents in accordance with an exemplary embodiment.

FIG. 6 illustrates a set of operations that allows synchronization of multiple contents in accordance with an exemplary embodiment. At 602 a multimedia content including an audio component and a video component is received. At 604, watermarks are embedded into one or both of the audio or the video component. The embedded watermarks include a first timing information that allows temporal identification of the audio or the video segments that include the embedded watermarks. At 606, the embedded multimedia content is processed for transmission to one or more electronic devices. The processed multimedia content includes a metadata stream or metadata section that includes a second timing information. The second timing information allows temporal identification of audio or video segments of the processed multimedia content. At 608, a first version of the processed multimedia content is obtained at a receiver device subsequent to transmission of the processed multimedia content through a communication channel. The first version lacks at least a portion of the second timing information that identifies temporal segments of at least one of the audio or video segments of the first version. At 610, watermark extraction operations are performed on the first version of the processed multimedia content to recover the first timing information. The first timing information includes a first timecode that conforms to a first type of timing system and identifies a temporal location of a first segment of the first version of the processed multimedia content. At 612, a timing system associated with a second content or a second content component related to the multimedia content is identified. At 614, upon a determination that the second timing system is different from the first timing system, a mapping that allows one or both of: a conversion of timecodes from the first timing system to the second timing system or a conversion of timecodes from the second timing system to the first timing system is obtained. At 616, the first or a subsequent segment of the first version of the processed multimedia content is synchronized with a corresponding section of the second content or the second content component related to the multimedia content using the mapping and one or both of the first timecode or a second timecode that is associated with the second content or the content component related to the multimedia content.

In one exemplary embodiment, prior to obtaining the first version of the processed multimedia content, one or more of the following operations is performed on the multimedia content: transcoding or format conversion. According to another embodiment, the first or the second timing system conform to one of the following timecode formats or protocols: a coordinated universal time (UTC), a linear timecode (LTC), a vertical interval timecode (VITC), a precision time protocol (PTP), a network time protocol (NTP), or a global positioning system (GPS). In yet another exemplary embodiment, the first timecode identifies a temporal location of a first audio segment of the first version of the processed multimedia content and the second timecode identifies a temporal location of a first video segment of the first version of the processed multimedia content.

In one exemplary embodiment, the first timecode identifies a temporal location of a first audio segment of the first version of the processed multimedia content and the first version lacks the second timing information that identifies temporal segments of the audio segments of the first version. In this embodiment, the second timecode is associated with a video segment of the first version that is obtained from a received metadata stream or meta data section. In one embodiment, the second timecode is associated with a secondary content or service that is associated with the multimedia content.

Another aspect of the disclosed embodiments relates to a system to facilitate synchronization of multiple contents that includes a watermark embedder implemented at least partially using electronic circuits, the watermark embedder to receive a multimedia content including an audio component and a video component, and to embed watermarks into one or both of the audio or the video component. The embedded watermarks include a first timing information that allows temporal identification of the audio or the video segments that include the embedded watermarks. The above noted system also includes a first processor and a first memory, comprising processor executable code. The processor executable code, when executed by the first processor, causes the processor to process the embedded multimedia content for transmission to one or more electronic devices, where the processed multimedia content includes a metadata stream or metadata section that includes a second timing information. The second timing information allows temporal identification of audio or video segments of the processed multimedia content.

The above noted system also includes a receiver that includes a second processor and a second memory comprising processor executable code. The processor executable code of the second memory, when executed by the second processor cause the second processor to obtain a first version of the processed multimedia content subsequent to transmission of the processed multimedia content through a communication channel, where the first version lacks at least a portion of the second timing information that identifies temporal segments of at least one of the audio or video segments of the first version. The processor executable code of the second memory, when executed by the second processor causes the second processor to further perform watermark extraction operations on the first version of the processed multimedia content to recover the first timing information. The first timing information includes a first timecode that conforms to a first type of timing system and identifies a temporal location of a first segment of the first version of the processed multimedia content. The processor executable code of the second memory, when executed by the second processor causes the second processor to additionally determine a timing system associated with a second content or a second content component related to the multimedia content. Upon a determination that the second timing system is different from the first timing system, the processor executable code of the second memory, when executed by the second processor causes the second processor to obtain mapping that allows one or both of: a conversion of timecodes from the first timing system to the second timing system or a conversion of timecodes from the second timing system to the first timing system. The processor executable code of the second memory, when executed by the second processor cause the second processor to synchronize the first segment content with a corresponding section of the second content or the second content component related to the multimedia content using the mapping and one or both of the first timecode or a second timecode that is associated with the second content or the second content component related to the multimedia content.

Figure 7:
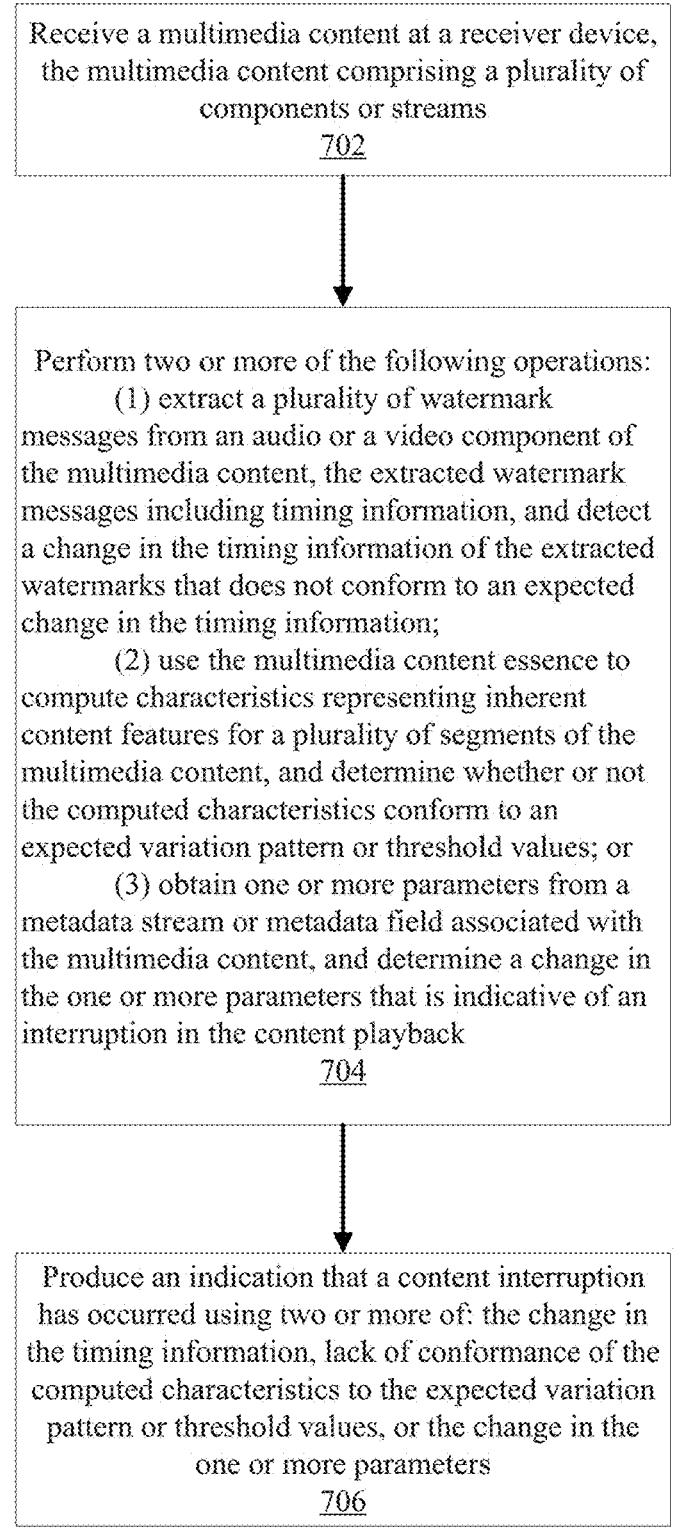
FIG. 7 illustrates a set of operations that can be carried out for determining an interruption in a content playback in accordance with an exemplary embodiment.

FIG. 7 illustrates a set of operations for determining an interruption in a content playback in accordance with an exemplary embodiment. At 702, a multimedia content is received at a receiver device. Such a received multimedia content includes a plurality of components or streams. At 704, two or more of the following operations are performed. (1) a plurality of watermark messages are extracted from an audio or a video component of the multimedia content, where the extracted watermark messages includes a timing information, and a change in the timing information of the extracted watermarks is detected that does not conform to an expected change in the timing information. (2) Using the multimedia content essence, characteristics representing inherent content features are computed for a plurality of segments of the multimedia content, and it is determined whether or not the computed characteristics conform to an expected variation pattern or threshold values. (3) One or more parameters are obtained from a metadata stream or metadata field associated with the multimedia content, and a change in the one or more parameters is determined that is indicative of an interruption in the content playback. At 706, an indication that a content interruption has occurred is produced using two or more of: the change in the timing information, lack of conformance of the computed characteristics to the expected variation pattern or threshold values, or the change in the one or more parameters.

In one exemplary embodiment, the above note method further includes modifying presentation of a secondary content that is associated with the multimedia content. In another exemplary embodiment, the content interruption is an interruption in the video component of the multimedia content, and modifying the presentation of the secondary content includes one or both of: stopping or pausing the presentation of the secondary content, or stopping or pausing the presentation of a video component of the secondary content. In yet another exemplary embodiment, the content interruption is detected at least in-part based on detecting a change in the timing information of the extracted watermarks, and modifying the presentation of the secondary content includes stopping the presentation of the secondary content, obtaining a new secondary content, and presenting the new secondary content in synchronization with the multimedia content.

According to one embodiment, the extracted watermarks include a watermark counter, and the expected change in the timing information includes a sequential increase of watermark counter values for sequential segments of the multimedia content. In one embodiment, using the multimedia content essence to compute the characteristics that represent inherent content features includes computing fingerprints for the plurality of the segments, and determining whether or not the computed characteristics conform to the expected variation pattern or threshold values includes communicating with a remote database to determine whether or not the computed fingerprints conform to an expected sequential order associated with fingerprints that are stored at the remote database.

In yet another exemplary embodiment, the content interruption is detected at least in-part based on detecting a change in the timing information of the extracted watermarks and lack of conformance of the computed characteristics to the expected variation pattern or threshold values. In this embodiment, the indication that a content interruption has occurred is produced upon a determination that segments of the multimedia content that produce the change in the timing information temporally overlap with segments of the multimedia content that correspond to computed characteristics that do not conform to the expected variation pattern or threshold values.

In another exemplary embodiment, using the multimedia content essence to compute characteristic parameters includes computing an energy level for a first segment of the audio component and determining that the computed energy level of the first segment of the audio component is below a first predetermined threshold value for a first predetermined period of time. In this embodiment, using the multimedia content essence to compute characteristic parameters also includes computing an energy level for a first segment of the video component of component of the multimedia content and determining that the computed energy level of the first segment of the video component is below a second predetermined threshold value for a second predetermined period of time. In this embodiment, the indication that a content interruption has occurred is produced based at least in-part upon a determination that there is a temporal overlap between the first and the second predetermined periods of time.

In one exemplary embodiment, determining the change in the one or more parameters is carried out based on one or more of: a change in color depth information, a change in black or white levels, scan type including overscan or underscan, a change in picture aspect ratio, a change in video format, a change in audio sample rate, a change in program channel number, a variation in a pattern of Transition-minimized Differential Signaling (TDMS) clock, or a presence or absence of AVMUTE signal. In another exemplary embodiment, determining the change in the one or more parameters comprises determining a change in a timecode value that is included as part of the metadata stream or the metadata field. In yet another exemplary embodiment, the extracted watermark messages include a server code and an interval code that are utilized for communication with an external database to receive a secondary content.

Figure 8:
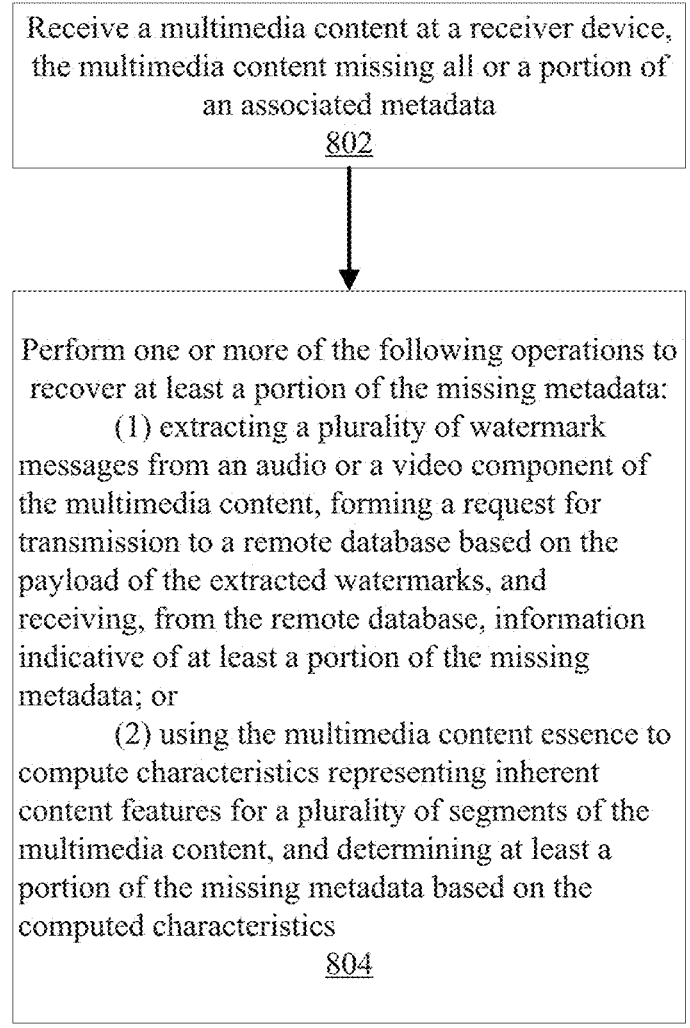
FIG. 8 illustrates a set of operations for recovering lost metadata that is associated with a multimedia content in accordance with an exemplary.

FIG. 8 illustrates a set of operations for recovering lost metadata that is associated with a multimedia content in accordance with an exemplary embodiment. At 802, a multimedia content is received at a receiver device, where the multimedia content is missing all or a portion of an associated metadata. At 804, one or more of the following operations are performed to recover at least a portion of the missing metadata. (1) A plurality of watermark messages are extracted from an audio or a video component of the multimedia content, a request is formed for transmission to a remote database based on the payload of the extracted watermarks, and information indicative of at least a portion of the missing metadata is retrieved from the remote database. (2) Using the multimedia content essence, characteristics representing inherent content features are computed for a plurality of segments of the multimedia content, and at least a portion of the missing metadata is determined based on the computed characteristics.

In one exemplary embodiment, using the multimedia content essence to compute the characteristics that represent inherent content features includes computing fingerprints for the plurality of the segments. In this embodiment, determining at least the portion of the missing metadata includes communicating the computed fingerprints to an external database, and receiving at least the portion of the missing metadata from the external database for the multimedia content that is identified based on the computed fingerprints. In another exemplary embodiment, using the multimedia content essence to compute the characteristics that represent inherent content features includes processing the multimedia content using a face recognition or an object recognition procedure to recover metadata that describes faces or objects in the multimedia content.

According to another exemplary embodiment, using the multimedia content essence to compute the characteristics that represent inherent content features includes processing the multimedia content to identify a scene change in the multimedia content, and using the identified scene change to recover metadata indicative of location of a segment of the multimedia content that has been subjected to a fade operation. In yet another exemplary embodiment, the multimedia content is received at the receiver device through a High-Definition Multimedia Interface (HDMI), where the received multimedia content includes information that allows recovery of at least a portion of the metadata.

In another exemplary embodiment, the above noted method of FIG. 5 further includes using at least the recovered portion of the metadata to enable acquisition of a secondary content for presentation with the multimedia content. In one exemplary embodiment, the multimedia content is received subsequent to conversion of the multimedia content from a first format to a second format that is compatible with the receiver device. In still another exemplary embodiment, conversion of the multimedia content to the second format causes at least a portion of the metadata to be lost.

Figure 9:
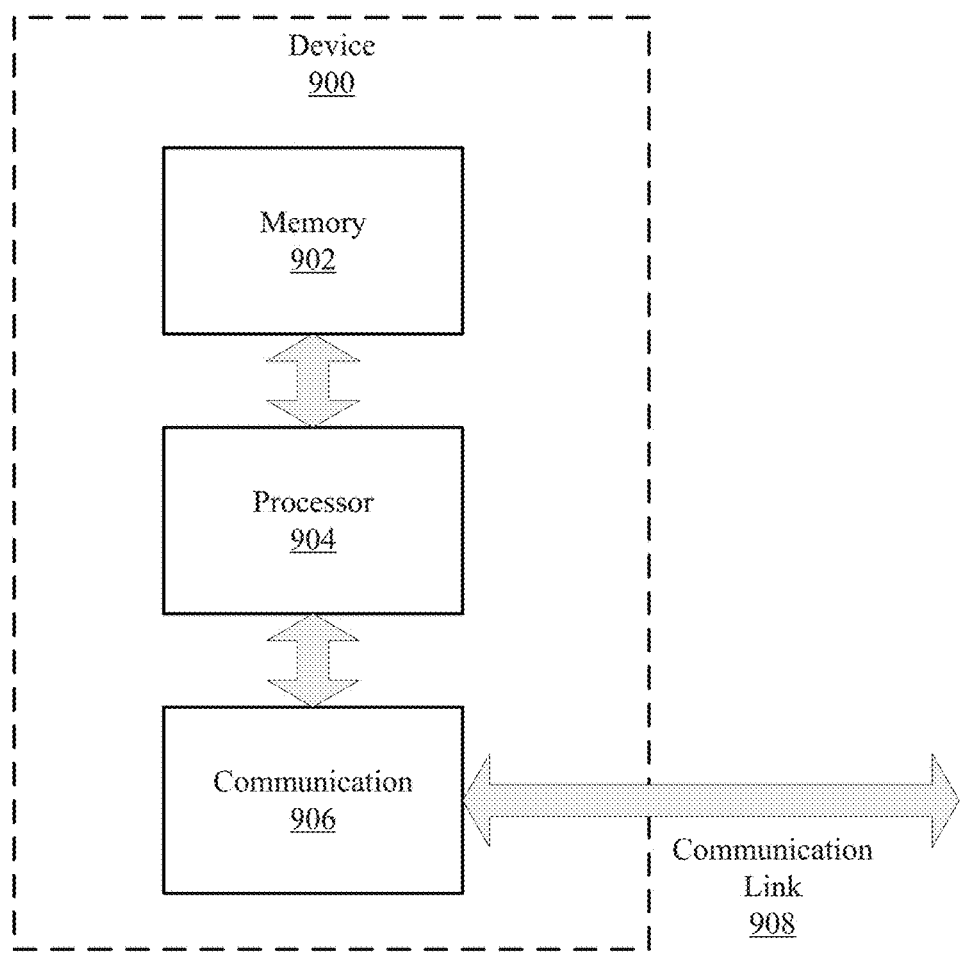
FIG. 9 illustrates a block diagram of a device for implementing various disclosed embodiments.

Certain aspects of the disclosed embodiments can be implemented as a device that includes a processor, and a memory comprising processor executable code. The processor executable code, when executed by the processor, configures the device to perform any one of and/or all operations that are described in the present application. FIG. 9 illustrates a block diagram of a device 900 within which various disclosed embodiments may be implemented. The device of FIG. 9 can be implemented as part of any one of: the Receiver device that is shown in FIG. 1 and includes a Watermark Detector, or as part of the Receiver, or the Watermark Client that are shown in FIG. 2. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 900 of FIG. 9 may be integrated as part of any devices or components shown in FIG. 1, 2 or 3 to carry out any of the disclosed methods.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for synchronizing multiple contents, comprising:
receiving a plurality of contents including a first and a second content;
performing watermark extraction operations on the first content to recover a first timecode that is incorporated as part of a watermark payload into a first segment of the first content, the first timecode conforming to a first type of timing system;
determining a timing system associated with the second content;
upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and synchronizing presentation of the second content with the first content using the mapping, wherein one of the first or the second timing systems provides timing information according to a counter value and the other of the first or the second timing systems provides a timing information according to a timecode format selected from one of:

a coordinated universal time (UTC),
a linear timecode (LTC),
a vertical interval timecode (VITC),
a precision time protocol (PTP),
a network time protocol (NTP), or
a global positioning system (GPS); and wherein:
the first timing system is a fixed timing system that is based on a reference timeline that begins from an initially embedded watermarked segment of the first content,
the mapping allows conversion between the first timing system and any of the second timing systems, and
the synchronizing comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

2. The method of claim 1, wherein the first timecode is a particular counter value that identifies the first segment of the first content relative to a reference location within the content's timeline.

3. The method of claim 1, wherein determining the second timing system includes analyzing a metadata stream associated with the second content to discern a type of timing system associated with timecodes of the second content.

4. The method of claim 1, wherein determining the second timing system includes extracting a watermark message from the second content to discern a type of timing system associated with timecodes of the second content.

5. The method of claim 1, wherein the first content and the second content are different components of a multimedia content.

6. The method of claim 5, wherein one or more of the following is true:
the first content is an audio component and the second content is a video component,
the first content is a video component and the second content is an audio component,
the first content is a television program and the second content is an advertisement,
the first content is a main audiovisual program and the second content is an interactive content, or
the first content is a main audiovisual program and the second content is a second language content.

7. The method of claim 1, wherein the first content is a main content received at a consumer electronic device and the second content is a secondary or interactive content associated with the main content.

8. The method of claim 7, wherein the first content and the second content are delivered to the consumer electronic device through different communication channels.

9. The method of claim 1, wherein the first timecode and the second timecode are generated based on a first clock and a second clock, respectively, and the mapping includes converting the first clock to the second clock, or the second clock to the first clock.

10. The method of claim 1, wherein
the reference timeline of the first timing system that begins from the initially embedded watermarked segment of the first content increments for each subsequent watermarked segment of the first content.

11. The method of claim 1, further comprising obtaining one or more additional mappings that allow conversion of the first or the second timecodes to one or more additional timing systems associated with one or more additional contents so as to allow the one or more additional contents to be synchronized with the first segment or a subsequent segment of the first content, or with the corresponding section of the second content.

12. The method of claim 1, wherein the at least one component of the first content and the at least one component of the second content are spliced together to form a rendered content.

13. A device, comprising:
a processor, and
a memory including processor executable code, the processor executable code, when executed by the processor configures the device to:
receive a plurality of contents including a first and a second content;
perform watermark extraction operations on the first content to recover a first timecode that is incorporated as part of a watermark payload into a first segment of the first content, the first timecode conforming to a first type of timing system;
determine a timing system associated with the second content;
upon a determination that the timing system associated with the second content is a second timing system that is different from the first timing system, obtain a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and
synchronize presentation of the second content with the first content using the mapping, wherein one of the first and second timing systems provides timing information according to a counter value and the other of the first or the second timing systems provides a timing information according to a timecode format selected from one of:
a coordinated universal time (UTC),
a linear timecode (LTC),
a vertical interval timecode (VITC),
a precision time protocol (PTP),
a network time protocol (NTP), or
a global positioning system (GPS); and wherein:
the first timing system is a fixed timing system that is based on a reference timeline that begins from an initially embedded watermarked segment of the first content, the mapping allows conversion between the first timing system and any of the second timing systems, and the synchronizing comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

14. The device of claim 13, wherein the first timecode is a particular counter value that identifies the first segment of the first content relative to a start location within the content's timeline.

15. The device of claim 13, wherein the processor executable code, when executed by the processor configures the device to analyze a metadata stream associated with the second content to discern a type of timing system associated with timecodes of the second content.

16. The device of claim 13, wherein the processor executable code, when executed by the processor configures the device to extract a watermark message from the second content to discern a type of timing system associated with timecodes of the second content.

17. The device of claim 13, wherein the first content and the second content are different components of a multimedia content.

18. The device of claim 17, wherein:
the first content is an audio component and the second content is a video component,
the first content is a video component and the second content is an audio component,
the first content is a television program and the second content is an advertisement,
the first content is a main audiovisual program and the second content is an interactive content, or
the first content is a main audiovisual program and the second content is a second language content.

19. The device of claim 13, wherein the first content is a main content received at the device and the second content is a secondary or interactive content associated with the main content.

20. The device of claim 19, wherein the device is configured to receive the first content and the second content through different communication channels.

21. The device of claim 13, wherein the first timecode and the second timecode are generated based on a first clock and a second clock, respectively, and the mapping includes converting the first clock to the second clock, or the second clock to the first clock.

22. The device of claim 13, wherein
the reference timeline of the first timing system that begins from the initially embedded watermarked segment of the first content increments for each subsequent watermarked segment of the first content.

23. The device of claim 13, wherein the processor executable code, when executed by the processor further configures the device to obtain one or more additional mappings that allow conversion of the first or the second timecodes to one or more additional timing systems associated with one or more additional contents so as to allow the one or more additional contents to be synchronized with the first segment or a subsequent segment of the first content, or with the corresponding section of the second content.

24. The device of claim 13, wherein the at least one component of the first content and the at least one component of the second content are spliced together to form a rendered content.

25. A computer program product, embodied on one or more non-tangible computer readable media, comprising:
program code for receiving a plurality of contents including a first and a second content;
program code for performing watermark extraction operations on the first content to recover a first timecode that is incorporated as part of a watermark payload into a first segment of the first content, the first timecode conforming to a first type of timing system;
program code for determining a timing system associated with the second content;
program code for upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and
program code for synchronizing presentation of the second content with the first content using the mapping, wherein one of the first and second timing systems provides timing information according to a counter value and the other of the first or the second timing systems provides a timing information according to a timecode format selected from one of:
a coordinated universal time (UTC),
a linear timecode (LTC),
a vertical interval timecode (VITC),
a precision time protocol (PTP),
a network time protocol (NTP), or
a global positioning system (GPS); and wherein:
the first timing system is a fixed timing system that is based on a reference timeline that begins from an initially embedded watermarked segment of the first content,
the mapping allows conversion between the first timing system and any of the second timing systems, and
the synchronizing comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

26. A method for synchronizing multiple contents, comprising:
receiving a plurality of contents including a first and a second content;
performing watermark extraction operations on the first content to recover a first timecode that is incorporated as part of a watermark payload into a first segment of the first content, the first timecode conforming to a first type of timing system;
determining a timing system associated with the second content;
upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and synchronizing presentation of the second content with the first content using the mapping, wherein the first timing system is a fixed timing system that is based on a reference timeline that begins from an initially embedded watermarked segment of the first content and the second timing systems provides timing information according to a timecode format selected from one of:

a coordinated universal time (UTC),
a linear timecode (LTC),
a vertical interval timecode (VITC),
a precision time protocol (PTP),
a network time protocol (NTP), or
a global positioning system (GPS); and wherein:
the mapping allows conversion between the first timing system and any of the second timing systems, and
the synchronizing comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

27. A device, comprising:
a processor, and
a memory including processor executable code, the processor executable code, when executed by the processor configures the device to:
receive a plurality of contents including a first and a second content;
perform watermark extraction operations on the first content to recover a first timecode that is incorporated as part of a watermark payload into a first segment of the first content, the first timecode conforming to a first type of timing system;
determine a timing system associated with the second content;
upon a determination that the timing system associated with the second content is a second timing system that is different from the first timing system, obtain a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and
synchronize presentation of the second content with the first content using the mapping, wherein the first timing system is a fixed timing system that is based on a reference timeline that begins from an initially embedded watermarked segment of the first content and the second timing systems provides timing information according to a timecode format selected from one of:
a coordinated universal time (UTC),
a linear timecode (LTC),
a vertical interval timecode (VITC),
a precision time protocol (PTP),
a network time protocol (NTP), or
a global positioning system (GPS); and wherein:
the mapping allows conversion between the first timing system and any of the second timing systems, and
the synchronized presentation comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

28. A computer program product, embodied on one or more non-tangible computer readable media, comprising:
program code for receiving a plurality of contents including a first and a second content;
program code for performing watermark extraction operations on the first content to recover a first timecode that is incorporated as part of a watermark payload into a first segment of the first content, the first timecode conforming to a first type of timing system;
program code for determining a timing system associated with the second content;
program code for upon a determination that the timing system associated with the second content is a second timing system that is different from the first timing system, obtaining a mapping that allows one or both of: a conversion of timecodes from the first timing system to the second timing system or a conversion of timecodes from the second timing system to the first timing system, wherein the mapping is obtained from an external database that is identified based on at least a portion of the extracted watermark payload; and
program code for synchronizing presentation of the second content with the first content using the mapping, the first timing system is a fixed timing system that is based on a reference timeline that begins from an initially embedded watermarked segment of the first content and the second timing systems provides timing information according to a timecode format selected from one of:
a coordinated universal time (UTC),
a linear timecode (LTC),
a vertical interval timecode (VITC),
a precision time protocol (PTP),
a network time protocol (NTP), or
a global positioning system (GPS); and wherein:
the mapping allows conversion between the first timing system and any of the second timing systems, and
the synchronizing comprises using the mapping to convert a particular timecode that conforms to the first timing system to another timecode that conforms to the second timing system, or to convert a particular timecode that conforms to the second timing system to another timecode that conforms to the first timing system, and to allow at least one component of the first content and at least one component of the second content to be rendered based on a common timeline and presented in a synchronized fashion.

* * * * *